(12) United States Patent
Zhang et al.

(10) Patent No.: US 12,223,940 B2
(45) Date of Patent: *Feb. 11, 2025

(54) SYSTEMS AND METHODS FOR NOISE CONTROL

(71) Applicant: SHENZHEN SHOKZ CO., LTD., Guangdong (CN)

(72) Inventors: Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/504,121

(22) Filed: Nov. 7, 2023

(65) Prior Publication Data

US 2024/0071355 A1  Feb. 29, 2024

Related U.S. Application Data

(63) Continuation of application No. 17/657,354, filed on Mar. 30, 2022, now Pat. No. 11,830,469, which is a
(Continued)

(51) Int. Cl.
*G10K 11/178* (2006.01)
*G06F 3/01* (2006.01)
*H04R 1/10* (2006.01)

(52) U.S. Cl.
CPC ........ *G10K 11/17815* (2018.01); *G06F 3/015* (2013.01); *H04R 1/1083* (2013.01); *H04R 2460/13* (2013.01)

(58) Field of Classification Search
CPC  H04R 1/1083; H04R 2460/13; G10K 11/178; G10K 11/1781; G10K 11/1783;
(Continued)

(56) References Cited

U.S. PATENT DOCUMENTS 5,001,763 A   3/1991  Moseley
6,175,633 B1  1/2001  Morrill et al.
(Continued)

FOREIGN PATENT DOCUMENTS

CN   101924967 A   12/2010
CN   110136731 A    8/2019
(Continued)

OTHER PUBLICATIONS

International Search Report in PCT/CN2019/124894 mailed on Aug. 28, 2020, 4 pages.
(Continued)

*Primary Examiner* — Jason R Kurr
(74) *Attorney, Agent, or Firm* — METIS IP LLC

(57) ABSTRACT

A system for reducing noise for a user includes a first detector configured to generate a first noise signal, wherein the first noise signal is a representation of a first noise that is transmitted to the user through a first sound pathway, and a second detector configured to generate a second noise signal, wherein the second noise signal indicates a second noise perceived by the user. The system also includes a processor configured to determine a noise correction signal based on the first noise signal and/or the second noise signal, and a speaker configured to generate a sound for reducing the noise based on the noise correction signal.

20 Claims, 14 Drawing Sheets

Related U.S. Application Data continuation of application No. 17/142,318, filed on Jan. 6, 2021, now Pat. No. 11,315,540, which is a continuation of application No. PCT/CN2019/124894, filed on Dec. 12, 2019.

(58) Field of Classification Search
CPC ....... G10K 11/17815; G10K 11/17817; G10K 11/17821; G10K 2210/1081; G10K 2210/3011; G10K 2210/3025; G10K 2210/3027; G10K 2210/3026; G06F 3/015

See application file for complete search history.

(56) References Cited

U.S. PATENT DOCUMENTS

| | | | |
|---|---|---|---|
| 6,396,930 | B1 | 5/2002 | Vaudrey et al. |
| 7,020,288 | B1 | 3/2006 | Ohashi |
| 9,294,836 | B2 | 3/2016 | Zhou et al. |
| 9,324,313 | B1 | 4/2016 | Zhong et al. |
| 9,928,825 | B2 | 3/2018 | Liu et al. |
| 10,362,385 | B1 | 7/2019 | Di Censo et al. |
| 2007/0014423 | A1 | 1/2007 | Darbut et al. |
| 2008/0196967 | A1 | 8/2008 | Breitbach et al. |
| 2008/0219486 | A1 | 9/2008 | Goldstein et al. |
| 2008/0260180 | A1 | 10/2008 | Goldstein et al. |
| 2009/0034748 | A1 | 2/2009 | Sibbald |
| 2010/0105447 | A1 | 4/2010 | Sibbald et al. |
| 2010/0260345 | A1 | 10/2010 | Shridhar et al. |
| 2010/0296666 | A1 | 11/2010 | Lin |
| 2011/0135106 | A1 | 6/2011 | Yehuday et al. |
| 2012/0300956 | A1 | 11/2012 | Horii |
| 2013/0142348 | A1 | 6/2013 | Weisman |
| 2013/0308785 | A1 | 11/2013 | Christoph |
| 2014/0126733 | A1 | 5/2014 | Gauger, Jr. et al. |
| 2015/0131838 | A1 | 5/2015 | Horii |
| 2015/0256949 | A1 | 9/2015 | Vanpoucke et al. |
| 2015/0296297 | A1 | 10/2015 | Hua et al. |
| 2016/0127815 | A1 | 5/2016 | Ookuri et al. |
| 2016/0217781 | A1 | 7/2016 | Zhong et al. |
| 2017/0110106 | A1 | 4/2017 | Kumar et al. |
| 2017/0112671 | A1 | 4/2017 | Goldstein |
| 2017/0148428 | A1 | 5/2017 | Thuy et al. |
| 2017/0171679 | A1 | 6/2017 | Isberg et al. |
| 2017/0287461 | A1 | 10/2017 | Ku |
| 2018/0226064 | A1 | 8/2018 | Seagriff et al. |
| 2019/0272814 | A1 | 9/2019 | Park et al. |
| 2021/0067863 | A1* | 3/2021 | Shinmen .............. H04R 1/1008 |
| 2021/0104219 | A1 | 4/2021 | Hua et al. |
| 2022/0223131 | A1 | 7/2022 | Zhang et al. |

FOREIGN PATENT DOCUMENTS

| | | |
|---|---|---|
| CO | 20190007246 S | 9/2019 |
| EP | 2642481 A1 | 9/2013 |
| EP | 2800091 B1 | 1/2016 |
| KR | 101456887 B1 | 11/2014 |
| WO | 2021062582 A1 | 4/2021 |

OTHER PUBLICATIONS

Written Opinion in PCT/CN2019/124894 mailed on Aug. 28, 2020, 4 pages.
The Extended European Search Report in European Application No. 19955436.1 mailed on Aug. 30, 2022, 16 pages.
First Office Action in Russian Application No. 2022111402 mailed on Mar. 3, 2023, 12 pages.
Notice of Rejection in Japanese Application No. 2022-535898 mailed on Jul. 31, 2023, 10 pages.
The Second Examination Report in Australian Application No. 2019477919 mailed on Jul. 5, 2023, 3 pages.
Notice of Reasons for Rejection in Japanese Application No. 2022535898 mailed on Jan. 9, 2024, 10 pages.
The Communication Pursuant to Article 94(3) EPC in European Application No. 19955436.1 mailed on Feb. 1, 2024, 12 pages.
Notice of Preliminary Rejection in Korean Application No. 10-2022-7023771 mailed on Aug. 27, 2024, 18 pages.
First Substantive Office Action Report in Colombian Application No. NC2022/0007681 mailed on Oct. 18, 2024, 22 pages.

* cited by examiner

200A

400

SYSTEMS AND METHODS FOR NOISE CONTROL

CROSS-REFERENCE TO RELATED APPLICATIONS

This application is a continuation of U.S. application Ser. No. 17/657,354, filed on Mar. 30, 2022, which is a continuation of U.S. application Ser. No. 17/142,318 (issued as U.S. Pat. No. 11,315,540), filed on Jan. 6, 2021, which is a Continuation of International Application No. PCT/CN2019/124894, filed on Dec. 12, 2019, the contents of which are hereby incorporated by reference.

TECHNICAL FIELD

The present disclosure generally relates to noise control, and more particularly, to systems and methods for noise control using an active noise reduction technique.

BACKGROUND

Noise reduction is often needed to suppress noise (e.g., an unwanted sound which is unpleasant, loud, or disruptive to hearing). Conventionally, the noise may be reduced in a passive manner by, for example, eliminating (or partially eliminating) the source of the noise, blocking the transmission of the noise, and/or preventing the ear of a user from hearing the noise, or the like, or any combination thereof. These noise reduction techniques may be passive and have a poor noise reduction effect under some conditions (e.g., when the noise has a low-frequency below a threshold frequency). Recently, an active noise reduction (ANR) technique has been adopted to reduce noises in an active manner by generating a noise reduction signal (e.g., a signal having an inverted phase to the noise to be reduced).

SUMMARY

In a first aspect of the present disclosure, a system is provided. The system may include a first detector, a second detector, a processor, and a speaker. The first detector may be configured to detect a first noise transmitted to a user through a first sound pathway and determine a first noise signal for representing the first noise. The second detector may be configured to detect a second noise perceived by the user and determine a second noise signal for representing the second noise. The processor may be configured to determine a first noise correction signal and second noise correction signal, wherein the first noise correction signal may be determined based on the first noise signal, and the second noise correction may be determined based on the second noise signal. The speaker may be configured to generate a sound based on the first noise correction signal and the second noise correction signal, wherein the sound may be transmitted to the user through a second sound pathway that is different from the first sound pathway.

In some embodiments, the second noise may include a residual sound in an inner ear of the user.

In some embodiments, the first detector may be an air conduction microphone and the first sound pathway may be an air conduction pathway.

In some embodiments, the second detector may be a nerve monitoring device or a brain wave monitoring device.

In some embodiments, the speaker may be a bone conduction speaker and the second sound path may be a bone conduction pathway.

In some embodiments, the system may further include one or more filters configured to decompose the noise signal into one or more sub-band noise signals.

In some embodiments, the processor may include an A/D converter and a modulator, wherein the modulator may be configured to perform amplitude modulation and/or phase modulation.

In some embodiments, the determining the first noise correction signal based on the first noise signal may include one or more operations. The system may determine a first transfer function of the first sound pathway and a second transfer function of the second sound pathway. An amplitude adjustment coefficient may be determined based on the first transfer function and the second transfer function. The first noise correction signal may be determined based on the first noise signal and the amplitude adjustment coefficient.

In some embodiments, the processor may be further configured to determine a first time difference of a sound transmitted through the first sound pathway and the second sound pathway.

In some embodiments, the determining the first noise correction based on the first noise signal may include one or more operations. The system may determine a phase inverted signal of the first noise signal. The first noise correction signal may be determined based on the first time difference and the phase inverted signal.

In some embodiments, the second detector may be further configured to detect a second time difference between a reference value and a transmission time of a sound through the second pathway of the user.

In some embodiments, the determining the first noise correction based on the first noise signal may include one or more operations. The system may determine the first noise correction signal based on the second time difference and the first noise signal.

In some embodiments, the determining the second noise correction signal based on the second noise signal may include one or more operations. The system may determine an amplitude adjustment coefficient, a first time difference of a sound signal transmitted through the first sound pathway and the second sound pathway, and a phase inverted signal of the second noise signal. The second noise correction signal may be determined based on the amplitude adjustment coefficient, the first time difference, and the phase inverted signal of the second noise signal.

In a second aspect of the present disclosure, a method for reducing noise for a user is provided. The method may include one or more of the following operations. A first noise signal may be determined by detecting a first noise transmitted to a user through a first sound pathway and detected by a first detector. A second noise signal may be determined by detecting a second noise perceived by the user and detected by a second detector. A first noise correction signal and second noise correction signal may be determined by a processor, wherein the first noise correction signal is determined based on the first noise signal, and the second noise correction is determined based on the second noise signal. A sound may be generated by a speaker based on the first noise correction signal and the second noise correction signal, wherein the sound is transmitted to the user through a second sound pathway that is different from the first sound pathway.

In some embodiments, the second noise may include a residual sound in an inner ear of the user.

In some embodiments, the first detector may be an air conduction microphone and the first sound pathway may be an air conduction pathway.

In some embodiments, the second detector may be a nerve monitoring device or a brain wave monitoring device.

In some embodiments, the speaker may be a bone conduction speaker and the second sound path may be a bone conduction pathway.

In some embodiments, the method may further include decomposing, by one or more filters, the noise signal into one or more sub-band noise signals.

In some embodiments, the processor may include an A/D converter and a modulator, wherein the modulator may be configured to perform amplitude modulation and/or phase modulation.

In some embodiments, the determining the first noise correction signal based on the first noise signal may include determining a first transfer function of the first sound pathway and a second transfer function of the second sound pathway. An amplitude adjustment coefficient may be determined based on the first transfer function and the second transfer function. The first noise correction signal may be determined based on the first noise signal and the amplitude adjustment coefficient.

In some embodiments, the method may further include determining, by the processor, a first time difference of a sound signal transmitted through the first sound pathway and the second sound pathway.

In some embodiments, the determining the first noise correction based on the first noise signal may include determining a phase inverted signal of the first noise signal and determining the first noise correction signal based on the first time difference signal and the phase inverted signal.

In some embodiments, the method may further include detecting, by the second detector, a second time difference between a reference value and a transmission time of a sound through the second pathway of the user.

In some embodiments, the determining the first noise correction based on the first noise signal may include determining the first noise correction signal based on the second time difference and the first noise signal.

In some embodiments, the determining the second noise correction signal based on the second noise signal may include determining an amplitude adjustment coefficient, a first time difference of a sound signal transmitted through the first sound pathway and the second sound pathway, and a phase inverted signal of the second noise signal. The second noise correction signal may be determined based on the amplitude adjustment coefficient, the first time difference, and the phase inverted signal of the second noise signal.

In a third aspect of the present disclosure, a system for reducing noise for a user is provided. The system may include a first detector, a second detector, a processor, and a bone conduction speaker. The first detector may be configured to detect a noise and determine a noise signal for representing the noise. The second detector may be configured to determine an error signal. The processor may be configured to determine a noise correction signal based on the error signal and the noise signal. The bone conduction speaker may be configured to generate a sound based on the noise correction signal, wherein the sound may be used to reduce the noise.

In some embodiments, the first detector may be an air conduction microphone and the noise may be transmitted to a user through an air conduction pathway, the sound may be transmitted to the user through a bone conduction pathway.

In some embodiments, determining the noise correction signal based on the error signal and the noise signal may comprise: determining an amplitude adjustment coefficient corresponding to the air conduction pathway and the bone conduction pathway; determining a time difference of a first sound transmitted through the air conduction pathway and a second sound transmitted through the bone conduction pathway; adjusting the amplitude adjustment coefficient and the time difference based on the error signal; and determining the noise correction signal based on an adjusted amplitude adjustment coefficient, an adjusted time difference and the noise signal.

In some embodiments, determining the amplitude adjustment coefficient may comprise: determining a first transfer function of the air conduction pathway; determining a second transfer function of the bone conduction pathway; and determining the amplitude adjustment coefficient based on the first transfer function and the second transfer function.

In some embodiments, the processor may include a modulator configured to perform amplitude modulation and/or phase modulation.

In some embodiments, the second detector may be an error microphone.

In some embodiments, the error signal may be corresponding to a superposition of a primary sound field and a secondary sound field, wherein the primary sound field may be corresponding to the noise, and the secondary sound field may be corresponding to the sound.

In a fourth aspect of the present disclosure, a method for reducing noise for a user is provided. The method may include one or more of the following operations. A noise signal may be determined by detecting, by a detector, a noise. A noise correction signal may be determined, by a processor, based on an adaptive adjustment process and the noise signal. A sound may be generated, by a bone conduction speaker, based on the noise correction signal, wherein the sound is used to reduce the noise.

In some embodiments, the detector may be an air conduction microphone and the noise may be transmitted to a user through an air conduction pathway, the sound may be transmitted to the user through a bone conduction pathway.

In some embodiments, determining the noise correction signal based on the adaptive adjustment process and the noise signal may comprise: determining an amplitude adjustment coefficient corresponding to the air conduction pathway and the bone conduction pathway; determining a time difference of a first sound transmitted through the air conduction pathway and a second sound transmitted through the bone conduction pathway; adjusting the amplitude adjustment coefficient and the time difference based on an error signal; and determining the noise correction signal based on an adjusted amplitude adjustment coefficient, an adjusted time difference and the noise signal.

In some embodiments, determining the amplitude adjustment coefficient may comprise: determining a first transfer function of the air conduction pathway; determining a second transfer function of the bone conduction pathway; and determining the amplitude adjustment coefficient based on the first transfer function and the second transfer function.

In some embodiments, the error signal may be corresponding to a superposition of a primary sound field and a secondary sound field, wherein the primary sound field may be corresponding to the noise, and the secondary sound field may be corresponding to the sound.

In some embodiments, the processor may include a modulator configured to perform amplitude modulation and/or phase modulation.

In a fifth aspect of the present disclosure, a system for reducing noise for a user is provided. The system may include a detector, a processor, and a speaker. The detector may be configured to generate a noise signal, wherein the noise signal may indicate a second noise perceived by the user and the second noise may include a residual sound in an inner ear of the user. The processor may be configured to determine a noise correction signal based on the noise signal. The speaker may be configured to generate a sound based on the noise correction signal.

In some embodiments, the detector may be a nerve monitoring device or a brain wave monitoring device.

In some embodiments, the speaker may be a bone conduction speaker.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
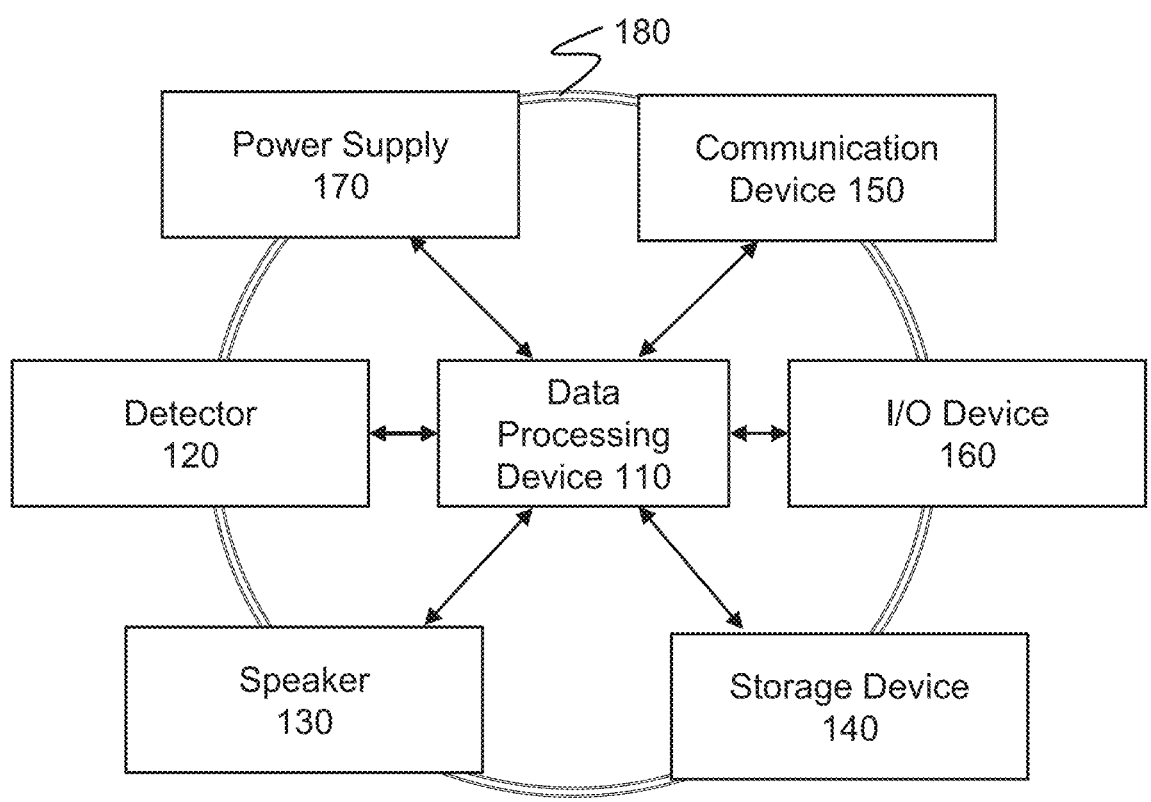
FIG. 1 is a schematic diagram illustrating an exemplary noise control system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid obscuring aspects of the present disclosure unnecessarily. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, sections or assembly of different levels in ascending order. However, the terms may be displaced by other expressions if they may achieve the same purpose.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

An aspect of the present disclosure relates to a noise control system. The noise control system may include a data processing device, a detector, and a bone conduction speaker. The detector may be configured to generate a noise signal. The noise signal may be a representation of a primary noise (e.g., an ambient sound) or a residual noise (e.g., a noise received by a cochlea of a user). The data processing device may be configured to determine a noise correction signal based on the noise signal. The bone conduction speaker may be configured to generate an anti-noise sound based on the noise correction signal to reduce or cancel the noise.

According to some embodiments of the present disclosure, the system may reduce the noise using a noise correction signal determined in a feedforward noise control path, a feedback noise control path, or a hybrid noise control path. The noise correction signal may be determined by performing phase modulation and/or amplitude modulation on the noise signal. In some embodiments, the phase modulation and/or the amplitude modulation may be performed by taking one or more factors including, such as a transmitting property of sound via different transmission paths and/or through different transmission mediums, individual differences, or the like, or any combination thereof, into consideration. This may enhance the effect of noise reduction and provide a good user experience.

In addition, in some embodiments, the noise control system disclosed herein may be utilized in an open design headphone. The anti-noise sound outputted by the bone conduction speaker may be transmitted and perceived by a user via a bone conduction pathway. In the bone conduction pathway, sound (e.g., the anti-noise sound) may be converted into mechanical vibrations in different frequencies and transmitted through a skull, an osseous labyrinth, a lymphoid fluid of an inner ear, an organum spiral, an auditory nerve, an auditory center of the user, or any combination thereof. Active noise reduction may be achieved in cases that the ears of the user are open or partially open by using the bone conduction technique. Compared with traditional air conduction headphones which use a closed design for noise reduction, the open design headphone may be more comfortable for ears and enhance the user experience.

The following description is provided to help better understanding of noise reduction methods and/or systems. The term "noise" used in this disclosure may refer to an unwanted sound judged to be unpleasant, loud or disruptive to hearing. The noise may be a broadband noise (e.g., an impulse noise of a gunshot) or a narrowband noise (e.g., a noise caused by a car's combustion engine). The term "noise signal" used in this disclosure may refer to a signal generated by an electrical device (e.g., a detector) that may represent a noise. This is not intended to limit the scope of the present disclosure. For persons having ordinary skills in the art, a certain amount of variations, changes, and/or modifications may be deducted under the guidance of the present disclosure. Those variations, changes, and/or modifications do not depart from the scope of the present disclosure.

FIG. 1 is a schematic diagram illustrating an exemplary noise control system 100 according to some embodiments of the present disclosure. The noise control system 100 may be configured to reduce or cancel a noise. The noise control system 100 may be applied various areas and/or devices, such as a wearable device (e.g., a noise-canceling headphone, a bone conduction headphone), a medical device (e.g., a breathing assistance device, a Continuous Positive Airway Pressure (CPAP) device), a muffler, an anti-snoring device, or the like, or any combination thereof. In some embodiments, the noise control system 100 may be an open ear noise control system that is used in an open design headphone. As used herein, an open design headphone refers to a headphone designed to allow some outside noise (e.g., an ambient sound) to mix with the headphone's output (e.g., music).

In some embodiments, the noise control system 100 may be an active noise control system to reduce or cancel a noise (e.g., an unwanted sound). The active noise control system may include an electroacoustic or electromechanical subsystem that neutralizes the noise on the basis of a superposition principle. For example, the reduction or cancelation of the noise may be carried out by generating an anti-noise sound having the same amplitude as and a reverse phase to the noise by the noise control system 100 and combining it with the noise. The anti-noise sound may be determined based on a noise correction signal for reducing the noise and a noise signal representing the noise.

The noise control system 100 may be a feedforward noise control system, a feedback noise control system, or a hybrid noise control system. One or more components of the feedforward noise control system may constitute a feedforward noise control path. Signals (e.g., a feedforward noise signal, a feedforward noise correction signal) may be transmitted through the feedforward noise control path. One or more components of the feedback noise control system may constitute a feedback noise control path. Signals (e.g., a feedback noise signal, a feedback noise correction signal) may be transmitted through the feedback noise control path.

In an exemplary feedforward noise control system, a feedforward detector (e.g., a microphone) may be placed outside a headset to determine a feedforward noise signal in the feedforward noise control path. The feedforward noise signal may be a primary noise signal. The primary noise signal may be a representation of a primary noise, such as ambient noise. The feedforward noise control system may be configured to determine a primary noise correction signal (or referred to as a feedforward noise correction signal) based on the feedforward noise signal.

In an exemplary feedback noise control system, a feedback detector (e.g., an error microphone) may be located inside of a headset or earbud. The feedback detector may generate a feedback noise signal by detecting a feedback noise in a user's ear (e.g., a noise received by an inner ear of the user). The feedback noise control system may be configured to determine a feedback noise correction signal based on the feedback noise signal. For example, the feedback noise signal may be a residual noise signal representing a residual noise. The feedback noise correction signal may be also referred to as a residual noise correction signal.

An exemplary hybrid noise control system may employ a feedforward detector and a feedback detector. The hybrid noise control system may be configured to determine a noise correction signal based on both a feedforward noise signal generated by the feedforward detector and a feedback noise signal generated by the feedback detector. The hybrid noise control system may include both the feedforward noise control path and the feedback noise control path as aforementioned. A major part of noise (e.g., an ambient noise) may be reduced or canceled by the feedforward noise control path. The feedback noise control path may be used to monitor a residual noise and reduce or cancel the residual noise.

As used herein, the term "noise control" may include any type and/or extent of control, adjustment, or regulation of any noise parameter (e.g., tone, pitch, loudness (or amplitude or intensity), quality, and/or phase), such as full or partial noise reduction, cancellation, leveling, or smoothing, for example.

As shown in FIG. 1, the noise control system 100 may include a data processing device 110, a detector 120, a speaker 130, a storage device 140, a communication device 150, an I/O device 160, and a power supply device 170. In some embodiments, two or more components of the noise control system 100 may be connected to and/or communicate with each other. For example, the I/O device 160 and the storage device 140 may be electrically connected to the communication device 150. As another example, the speaker 130 may communicate to the data processing device 110 through the communication device 150 or a network 180. As used herein, a connection between two components may include a wireless connection, a wired connection, any other communication connection that can enable data transmission and/or reception, and/or any combination of these connections. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. The wired connection may include, for example, a coaxial cable, a communication cable (e.g., a telecommunication cable), a flexible cable, a spiral cable, a non-metallic sheath cable, a metal sheath cable, a multi-core cable, a twisted-pair cable, a ribbon cable, a shielded cable, a double-strand cable, an optical fiber, an electrical cable, an optical cable, a telephone wire, or the like, or any combination thereof.

The data processing device 110 may be configured to process data. The data may include a sound signal (e.g., a noise signal and a speech signal), information relating to a human characteristic (e.g., a bone density), information relating to the environmental (e.g., a temperature), or the like, or any combination thereof. The data may be obtained by the detector 120 or retrieved from another source (e.g., the storage device 140). For example, the data may include one or more noise signals obtained by the detector 120. Based on the data, the data processing device 110 may be configured to determine a user characteristic, recognize a noise, recognize a speech, perform a noise reduction operation, generate a control signal, perform an analog-to-digital conversion, perform a digital-to-analog conversion, convert a signal between the time domain and the frequency domain, divide a signal into a plurality of sub-band signals with different frequency bands, or the like, or any combination thereof.

Figure 4:
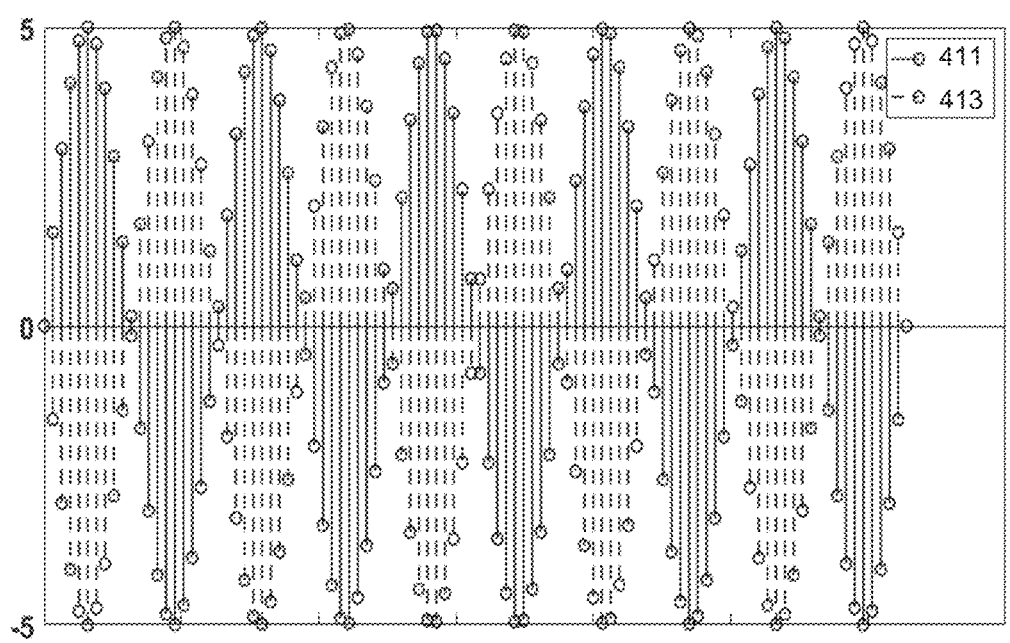
FIG. 4 is a schematic diagram illustrating an exemplary noise signal and an exemplary noise correction signal according to some embodiments of the present disclosure.

In some embodiments, the data processing device 110 may be configured to determine a noise correction signal based on a noise signal. The noise signal may be a representation of noise. The noise may be a primary noise, a residual noise, or the like, or any combination thereof. A noise source of the noise may be related to or not related to the noise control system 100. The noise correction signal may be used to determine an anti-noise sound to reduce or cancel the noise. For example, the anti-noise sound may have the same amplitude as but an inverted phase (as known as antiphase) to the noise as shown in FIG. 4. The noise correction signal may be a digital signal or an analog signal. The noise correction signal may be a time domain signal or a frequency domain signal. The noise correction signal may be a broadband signal or a narrowband signal. In some embodiments, the noise correction signal may include a plurality of sub-band noise correction signals. The data processing device 110 may output the noise correction signal in any form, for example, a pulse width modulation (PWM), a digital signal, an analog signal. In some embodiments, the noise correction signal may include a plurality of signals, the data processing device 110 may output a combined signal of the signals, or output the signals respectively or in parallel.

Figure 5:
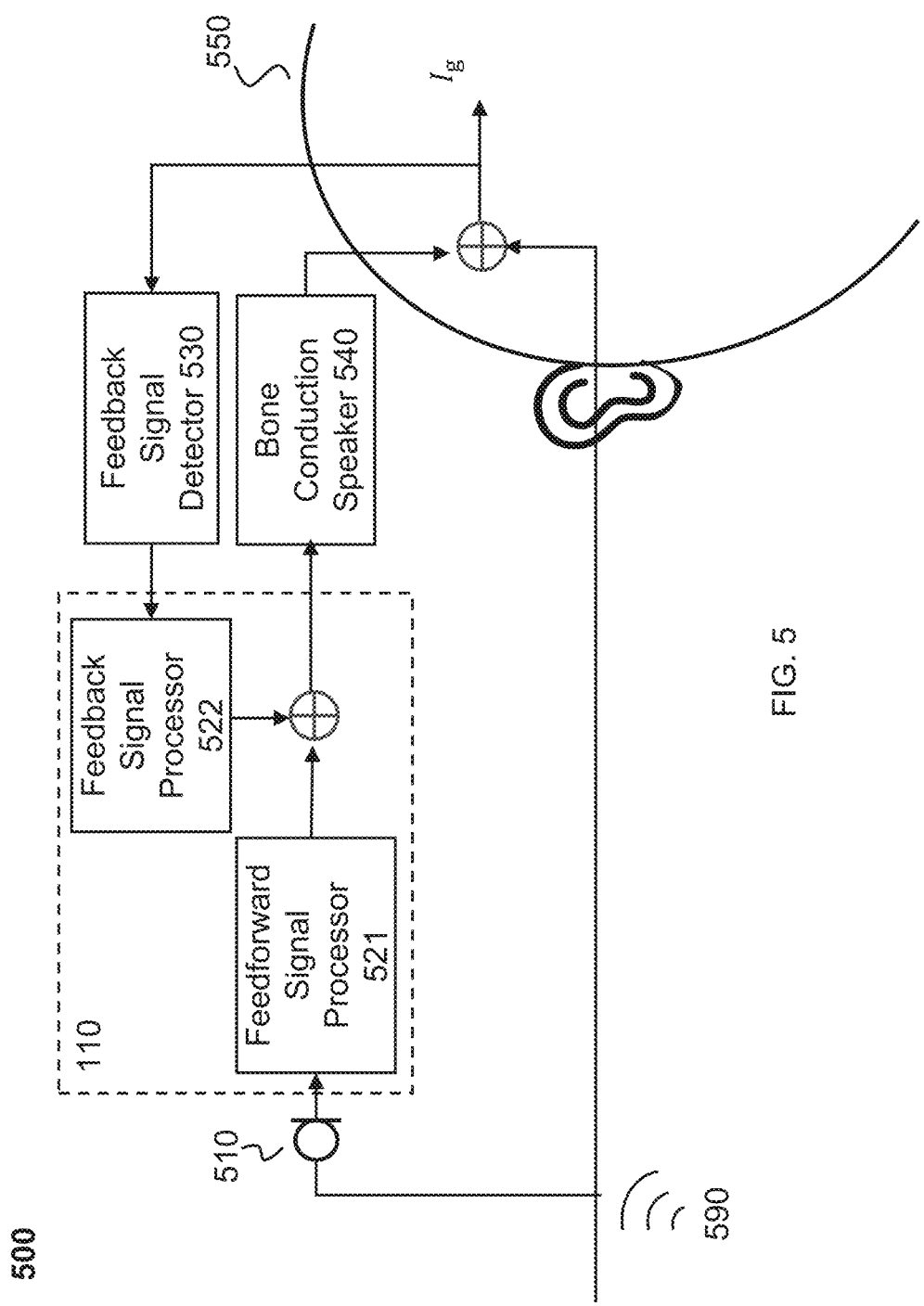
FIG. 5 is a schematic diagram illustrating an exemplary noise control system according to some embodiments of the present disclosure.
Figure 6:
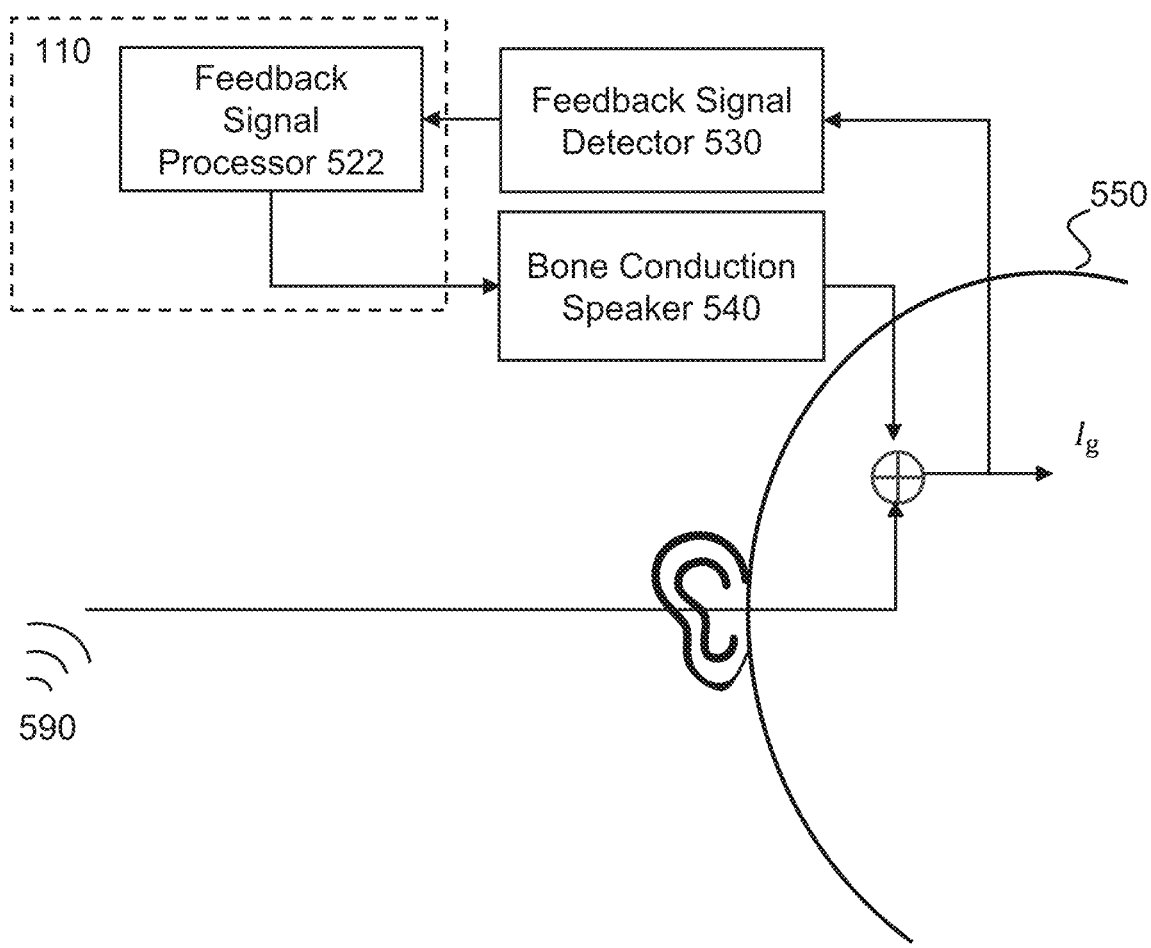
FIG. 6 is a schematic diagram illustrating an exemplary noise control system according to some embodiments of the present disclosure.
Figure 7:
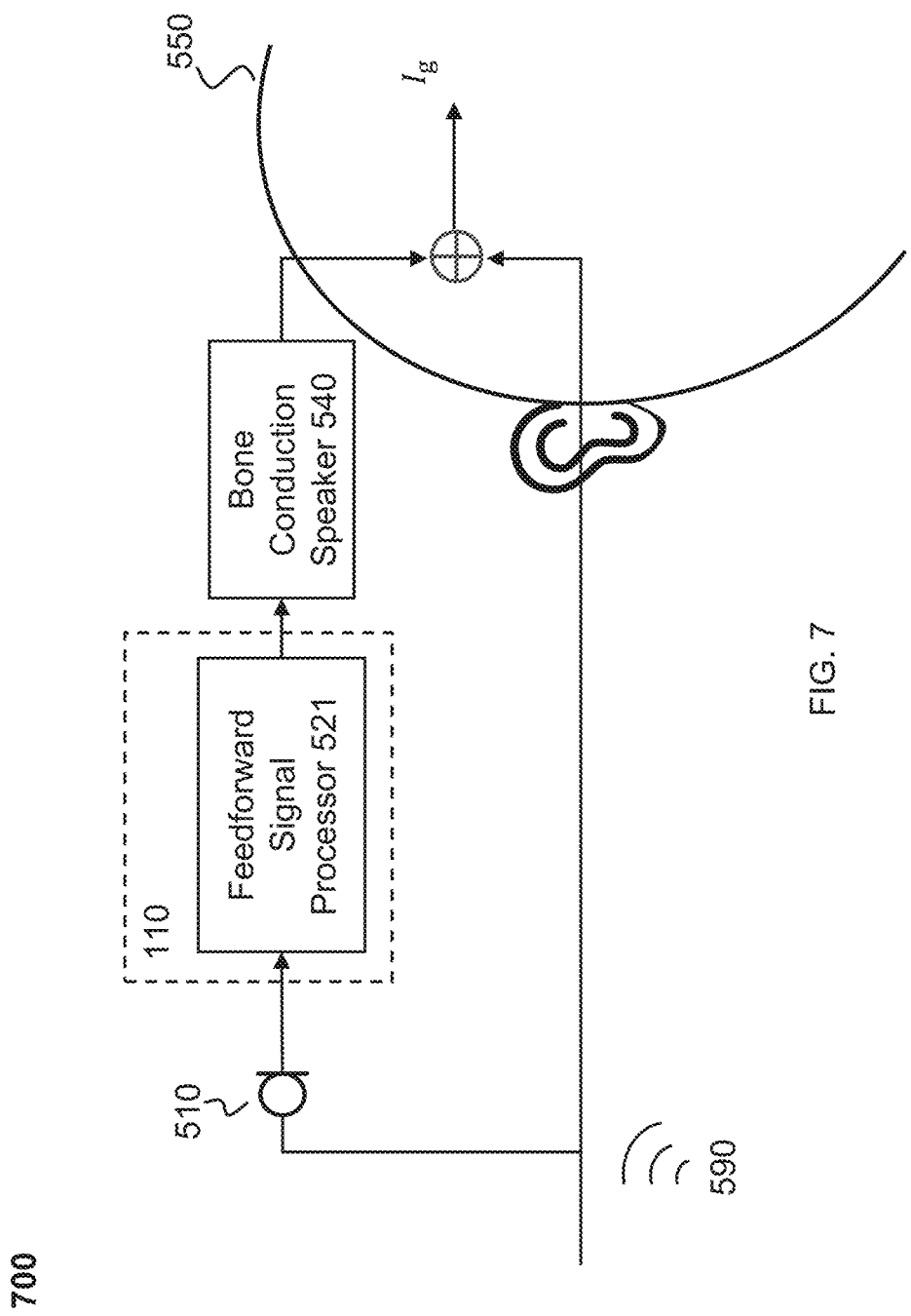
FIG. 7 is a schematic diagram illustrating an exemplary noise control system according to some embodiments of the present disclosure.

In some embodiments, the data processing device 110 may include a signal processor (e.g., a feedforward signal processor 521, a feedback signal processor 522 as shown in FIGS. 5-7), a filter, a sensor, a memory, or the like, or any combination thereof. For example, the data processing device 110 may include one or more components as shown in FIGS. 8-13. In some embodiments, the data processing device 110 may be a digital signal processor (DSP). For example, the data processing device 110 may be implemented on a chip (SOC), a Bluetooth chip, a DSP chip, or codec with DSP integrated circuits (ICs).

The detector 120 may be configured to generate a noise signal. The noise signal may be a representation of noise. The noise signal may be a digital signal or an analog signal. The noise signal may be a time domain signal or a frequency domain signal. The noise signal may be a broadband signal or a narrowband signal. The noise signal may be a full-band noise signal or a sub-band noise signal. In some embodiments, the noise signal may include a plurality of sub-band noise signals. In some embodiments, the noise signal may be a feedforward noise signal corresponding to a feedforward noise control path or a feedback noise signal corresponding to a feedback noise control path.

The noise signal may be detected based on a physical, chemical, and/or biological effect. For example, the noise may be converted into a measurable physical quantity (e.g., an electrical voltage, an electrical current, an electrical charge, an electrical impedance, a magnetic field strength), and the measurable physical quantity may be converted into a noise signal in the form of an electrical signal. For another example, the noise may be converted into a measurable chemical or biological quantity, and the chemical or biological quantity may be converted into a noise signal in the form of an electrical signal.

The detector 120 may generate the noise signal by detecting the noise directly or indirectly. For example, the detector 120 may generate the noise signal base on mechanical vibration of the noise. As another example, the detector 120 may generate the noise signal through an intermediate quantity (e.g., a brain wave) corresponding to the noise.

In some embodiments, the noise signal generated by the detector 120 may include a primary noise signal. The primary noise signal may be a representation of a primary noise (e.g., an ambient noise). The primary noise signal may be processed in the feedforward noise control path as a feedforward noise signal. Additionally or alternatively, the noise signal may include a residual noise signal. The residual noise signal may be a representation of residual noise. The residual noise signal may be processed in the feedback noise control path as a feedback noise signal.

In some embodiments, the detector 120 may be configured to evaluate a noise reduction effect. The evaluation of the noise reduction effect may be performed based on one or more parameters, for example, an intensity of residual noise, a difference between a reference value and a transmission time of a sound through a bone conduction pathway of a user. In some embodiments, the detector 120 may be a detector array including a plurality of detectors, which may be arranged in, for example, a linear design, a planar design, a cylindrical design, or a spherical design.

The detector 120 may include an acoustic electric transducer, a photoelectric transducer, an electrochemical sensor, a nerve monitoring device, a brain wave monitoring device, or the like, or any combination thereof. For example, the detector 120 may include an accelerometer to detect vibrations associated with noise. As another example, the detector 120 may include an acoustic electric transducer, for example, a microphone, an error microphone. Exemplary microphones may include a ribbon microphone, a Micro-Electro-Mechanical System (MEMS) microphone, a dynamic microphone, a piezoelectric microphone, a condenser microphone, a carbon microphone, an analogue microphone, a digital microphone, or the like, or any combination thereof. The microphone may include an omnidirectional microphone, a unidirectional microphone, a bidirectional microphone, a cardioid microphone, or the like, or any combination thereof. In some embodiments, the microphone may be sensitive to a sound having a particular frequency (such as 20 Hz-20,000 Hz, 1000 Hz-3000 Hz, 300 Hz-3000 Hz, 20 Hz-200 Hz, etc.).

In some embodiments, the detector 120 may include a plurality of acoustic electric transducers. The frequency response characteristics of the acoustic electric transducers may be the same or different. For example, the detector 120 may include a plurality of acoustic electric transducers with different frequency response characteristics so as to detect a plurality of sub-band noise signals. Optionally, the acoustic electric transducers may be arranged in any configuration. For example, the detector 120 may include two omnidirectional microphones that are used in a headset. The two omnidirectional microphones may be placed at different positions with respect to the mouth of a user of the headset.

In some embodiments, the detector 120 may include a biological monitoring device (e.g., a neurotransmitter sensor, a neuro monitoring device, an electroencephalograph monitoring device). The biological monitoring device may be configured to determine a noise signal representing a noise perceived by a user by monitoring one or more biological characteristics of the user. For example, the noise perceived by the user may be a residual noise. The biological characteristic(s) of the user may include the brainwave, the body temperature, activities of neurons, or the like of the user, or any combination thereof. In some embodiments, the biological monitoring device may be configured to determine a time difference between a reference value and a transmission time of a sound through a bone conduction pathway of a user. The reference value may be a preset value. In some embodiments, the detector 120 may be an audio sensor 510 or a feedback signal detector 530 as shown in FIGS. 5-7.

The speaker 130 may be configured to generate a sound based on a sound signal. The speaker 130 may include one or more bone conduction speakers, air conduction speakers, or the like, or a combination thereof. In some embodiments, the speaker 130 may include a bone conduction speaker. For example, the bone conduction speaker may include a vibration board and a transducer. The transducer may be configured to generate vibrations by, for example, converting an electrical signal to mechanical vibrations. The transducer may drive the vibration board to vibrate. Merely by way of example, the vibration board may be mechanically connected to the transducer and vibrate with the transducer. The vibration board may touch the skin of the user and pass vibrations to auditory nerves through human tissues and bones, which in turn, may enable the user to hear a sound. In some embodiments, the bone conduction speaker may generate an anti-noise sound based on a noise correction signal. The noise correction signal may be determined by the data processing device 110 or retrieved from another source (e.g., the storage device 140). The anti-noise sound may be configured to reduce or cancel a noise based on a destructive interference between the anti-noise sound and the noise. In some embodiments, the noise control system 100 may include a plurality of speakers 130, which may be arranged in, for example, a linear design array, a planar array, a cylindrical array, or a spherical array.

The storage device 140 may store data and/or instructions. In some embodiments, the storage device 140 may store data obtained from the detector 120 and/or the data processing device 110. In some embodiments, the storage device 140 may store data and/or instructions that the noise control system 100 may execute or use to perform exemplary methods described in the present disclosure. In some embodiments, the storage device 140 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 180 to communicate with one or more components in the noise control system 100 (e.g., the data processing device 110, the detector 120, the speaker 130, etc.). One or more components in the noise control system 100 may access the data or instructions stored in the storage device 140 via the network 180. In some embodiments, the storage device 140 may be directly connected to or communicate with one or more components in the noise control system 100 (e.g., the data processing device 110, the detector 120, the speaker 130, etc.). In some embodiments, the storage device 140 may be part of the data processing device 110.

The communication device 150 may be configured to communicate with one or more components of the noise control system 100 or other devices (e.g., a smartphone). The communication device 150 may use one or more communication protocols, for example, Bluetooth, ZigBee, Wi-Fi, cellular network, NB-IoT(Narrow Band Internet of Things)/5G, 2G/3G/4G, GPRS, Z-Wave, or the like, or any combination thereof. For example, the communication device 150 may communicate with an APP embedded in a device to receive control signals.

The I/O device 160 may input and/or output signals, data, information, etc. In some embodiments, the I/O device 160 may enable user interaction with the noise control system 100. For example, the I/O device 160 may be configured to receive a control signal to control one or more components of the noise control system 100. In some embodiments, the I/O device 160 may include an input device and an output device. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to another component (e.g., the processing device 140) via, for example, a bus, for further processing. Other types of input devices may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The power supply device 170 may be configured to supply power to one or more components of the noise control system 100. For example, the power supply device 170 may be a battery, such as a rechargeable battery, a detachable battery, a lithium battery, or the like. In some embodiments, the noise control system 100 may operate in one or more modes. The noise control system 100 may be sensitive to reduce or cancel a noise having a particular frequency in each of the one or more modes.

It should be noted that the above descriptions of the noise control system 100 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the noise control system 100 may include one or more additional components. Additionally or alternatively, one or more components of the noise control system 100 described above may be omitted. For example, the storage device 140 and/or the I/O device 160 may be omitted. As another example, two or more components of the noise control system 100 may be integrated into a single component. Merely by way of example, the storage device 140 and/or the I/O device 160 may be integrated into the data processing device 110. Additionally or alternatively, the communication device 150 may be integrated into the I/O device 160.

Figure 2A:
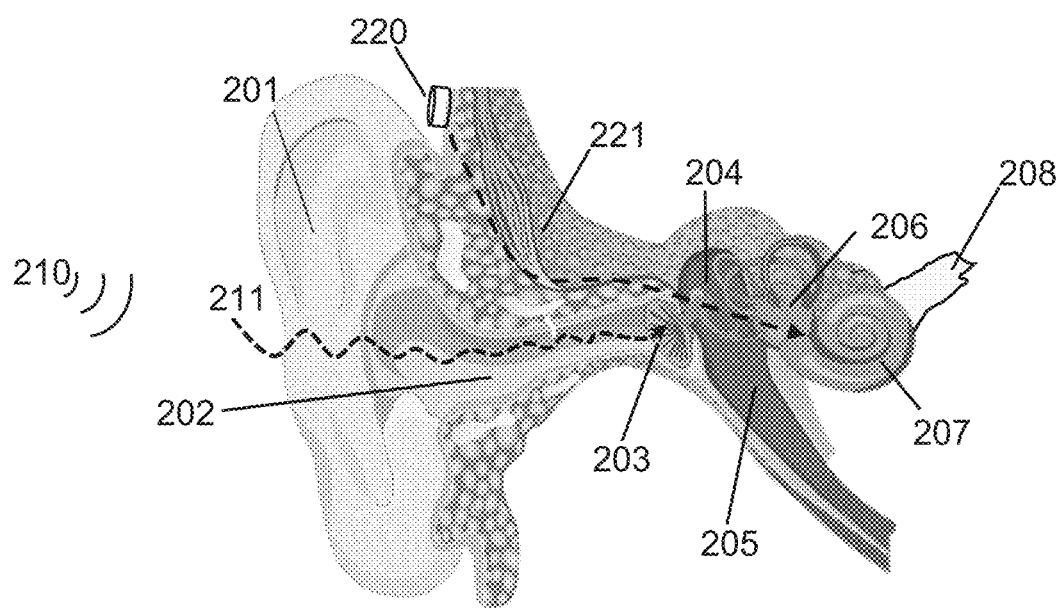
FIG. 2A is a schematic diagram illustrating exemplary anatomy of an ear of a user.

FIG. 2A is a schematic diagram illustrating exemplary anatomy of an ear 200A of a user. The ear 200A may include a pinna 201, an ear canal 202, an eardrum 203, an ossicular chain 204, a eustachian tube 205, a semicircular canal 206, a cochlea 207, and an auditory nerve 208. An out ear may include the pinna 201 and the ear canal 202. A middle ear may include the eardrum 203, the ossicular chain 204, and the eustachian tube 205. An inner ear may include semicircular canal 206 and the cochlea 207. Human beings may hear sound through their bones (i.e., bone conduction) and/or their eardrums (i.e., air conduction).

As shown in FIG. 2, an air conduction (AC) pathway 211 may include the ear canal 202, the eardrum 203, and the cochlea 207. In the air conduction pathway 211, the eardrum 203 may convert sound waves of a noise 210 into vibrations and transmit the vibrations to the cochlea 207. The cochlea 207 may be connected to the auditory nerve 208, which may transmit signals corresponding to the noise 210 to the brain of the user.

A bone conduction (BC) pathway 221 may be formed by one or more bones of the user, the cochlea 207, and a bone conduction device (e.g., a bone conduction speaker 220). In the bone conduction pathway 221, the bone conduction device may have the same or similar functions as the eardrum 203 of the air conduction pathway 211 as aforementioned. The bone conduction device may generate sound waves and convert the sound waves into vibrations, which may be transmitted to and received by the cochlea 207 through bones (or skull) and the skin of the user. The cochlea 207 may be connected to the auditory nerve 208, which may transmit signals corresponding to the sound to the brain of the user. It should be noted that the above descriptions of the bone conduction pathway 221 are intended to be illustrative, and not to limit the scope of the present disclosure. For example, the bone conduction pathway 221 may include jaw bones and/or cheekbones of the user.

Figure 2B:
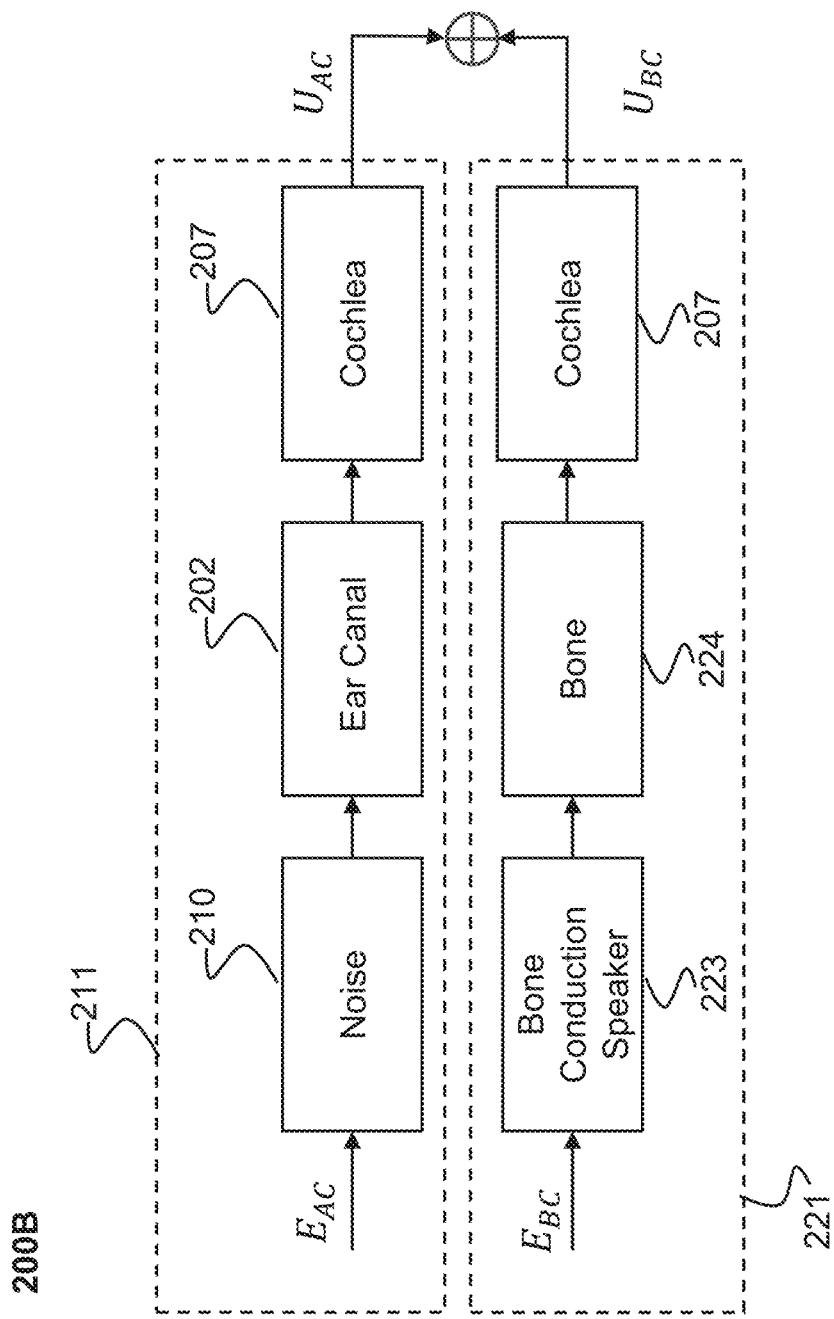
FIG. 2B is a schematic diagram illustrating an exemplary air conduction pathway and an exemplary bone conduction pathway according to some embodiments of the present disclosure.

FIG. 2B is a schematic diagram illustrating an exemplary air conduction pathway 211 and an exemplary bone conduction pathway 221 according to some embodiments of the present disclosure. A sound may be transmitted to a cochlea 207 of a user through the air conduction pathway 211 or the bone conduction pathway 221. The sound transmission loss (STL) of the sound may be affected by, for example, a property (e.g., the frequency) and a sound transmission pathway (e.g., a transmission medium) of the sound. In an active noise control system, the sound transmission loss of different sound transmission pathways may need to be taken into consideration.

In the air conduction pathway 211, noise 210 (or referred to as an air conduction noise) may be transmitted through an ear canal 202 to the cochlea 207 of the user. The sound intensity of the noise 210 may be denoted as $E_{AC}$. The noise 210 may be transmitted to, absorbed or reflected by a barrier (e.g., the ear canal 202 and the eardrum 203 as shown in FIG. 2A) in the air conduction pathway 211. The noise 210 may be transmitted along the air conduction pathway 211 and received by the cochlea 207 of the user. For illustration purposes, the noise 210 received by the user may be denoted as a noise A. The sound intensity of the noise A received by the user may be denoted as $U_{AC}$. A transfer function $H_{AC}$ of the air conduction pathway 211 may be determined according to Equation (1) as below:

$$H_{AC} = \frac{U_{AC}}{E_{AC}}. \quad (1)$$

In the bone conduction pathway 221, an anti-noise sound (or referred to as a bone conduction sound) for reducing or suppressing the noise 210 may be transmitted through one or more bones 224 (e.g., a temporal bone) to the cochlea 207 of the user. The anti-noise sound may be generated by a bone conduction speaker 223. The anti-noise sound may be transmitted to, absorbed or reflected by a barrier (e.g., a temporal bone and muscle of the user) in the bone conduction pathway 221. For example, the anti-noise sound may be transmitted along the bone conduction pathway 221 and received by the cochlea 207 of the user. For illustration purposes, the anti-noise sound received by the user may be denoted as an anti-noise sound B. The sound intensity of the original anti-noise sound may be denoted as $E_{BC}$. The sound intensity of the anti-noise sound B received by the user may be denoted as $U_{BC}$. A transfer function $H_{BC}$ of the bone conduction pathway 221 may be determined according to Equation (2) as below:

$$H_{BC} = \frac{U_{BC}}{E_{BC}}. \tag{2}$$

In some embodiments, in order to achieve a desired destructive interference between the noise A and the anti-noise sound B, the sound intensity of the noise A (i.e., $U_{AC}$) and the sound intensity of the anti-noise sound B (i.e., $U_{BC}$) may need to be equal to each other. Ideally, if the transfer function $H_{AC}$ of the air conduction pathway 211 is equal to the transfer function $H_{BC}$ of the bone conduction pathway 221, and the sound intensity $E_{AC}$ of the noise 210 is equal to the sound intensity $E_{BC}$ of the original anti-noise sound, the sound intensity $U_{AC}$ of the noise A may be equal to the sound intensity $U_{BC}$ of the anti-noise sound B. However, a difference between the transfer functions of the air conduction pathway 211 and the bone conduction pathway 221 may exist and lead to a difference between $U_{AC}$ and $U_{BC}$ even if $E_{AC}$ is equal to $E_{BC}$. In such cases, the amplitude of the anti-noise sound may need to be modulated such that the sound intensity $U_{BC}$ of the anti-noise sound B may be equal to the sound intensity $U_{AC}$ of the noise A.

A relationship between the transfer functions of the air conduction pathway 211 and the bone conduction pathway 221 may be determined according to Equation (3) as below:

$$A_t = \frac{H_{AC}}{H_{BC}}, \tag{3}$$

where $A_t$ refers to an amplitude adjustment coefficient in determining the anti-noise sound in a feedforward noise control path.

In some embodiments, in order to achieve a desired destructive interference between the noise A and the anti-noise sound B at the cochlea 207, a modulation operation may be performed by the data processing device 110 in generating a noise correction signal according to Equation (4) as below:

$$A_t S'_n(n) H_{BC} + S_n(n) H_{AC} = 0, \tag{4}$$

where $S_n(n)$ refers to a noise signal representing the noise 210 to be reduced, $A_t$ refers to the amplitude adjustment coefficient, $A_t S'_n(n)$ refers to a noise correction signal, and $S'_n(n)$ refers to a signal having the same amplitude as but an inverted phase to the noise signal $S_n(n)$. The noise correction signal may be used as an input signal of the bone conduction speaker 223 to generate the anti-noise sound for reducing the noise 210.

In some embodiments, the noise signal representing the noise 210 may include N sub-band noise signals having different frequency bands. The noise correction signal $A_t S_n'(n)$ may include a plurality of sub-band noise correction signals. For example, the noise correction signal may be represented as $\Sigma_{i=1}^{N} A_i S_i'(n)$, wherein $A_i$ refers to an amplitude adjustment coefficient for an $i^{th}$ sub-band noise signal, N refers to a count (or number) of the sub-band noise signals, and $S_i'(n)$ refers to a signal having the same amplitude as but inverted phase to the sub-band noise signal $S_i(n)$.

In some embodiments, a time difference may exist between a time when the noise A is transmitted to the cochlea 207 along the air conduction pathway 211 and a time when the anti-noise sound B is transmitted to the cochlea 207 along the bone conduction pathway 221. The time difference may lead to a phase difference between the noise signal $S_n(n)$ and its phase reversed signal $S'_n(n)$. The phase difference may need to be compensated to reduce or eliminate an effect of the phase difference on the stability of a filter and an ambient noise (e.g., a high frequency ambient noise) caused by the phase difference. For example, the phase compensation may need to be performed in generating a noise correction signal of the noise 210. A phase shift in the frequency domain may be mapped to a delay in the time domain. The phase compensation may be performed based on a time difference $\Delta T$ between a first time needed for an air conduction sound to transmit to the cochlea 207 along the air conduction pathway 211 and a second time for a bone conduction sound to transmit to the cochlea 207 along the bone conduction pathway 221. For example, a noise correction signal with phase compensation may be represented as $A_t S'_n(n-\Delta T)$. As another example, the noise correction signal with phase compensation may include a plurality of sub-band noise correction signals. For example, the noise correction signal with phase compensation may be represented as $\Sigma_{i=1}^{N} A_i S'_i(n-\Delta T)$.

In some embodiments, in order to achieve a desired destructive interference between the noise A and the anti-noise sound B at the cochlea 207, a modulation operation may be performed by the data processing device 110 in generating a noise correction signal according to Equation (5) as below:

$$A_t S'_n(n-\Delta T) H_{BC} + S_n(n) H_{AC} = 0. \tag{5}$$

For different users, the density or size of the skulls, the length of ear canals, and/or the internal sound transmission efficiency of the ears may be different. The sound transmission speeds of a certain conduction pathway (e.g., a bone conduction pathway and/or an air conduction pathway) may be different for different users. Although the acoustic velocity in a solid material is fast, the transmission times of the same sound in the conduction pathways of different users may still be different. The difference in the transmission times may correspond to a phase shift, which may have an influence on the noise reduction effect, especially for some high frequency narrow-band noise. A time difference $k_e$ may be introduced to determine a noise correction signal. The time difference $k_e$ may be a time difference between a reference value and a transmission time of a sound through a bone conduction pathway of a user. The reference value may be a preset value. The preset value may be determined through a statistical method or set manually. The time difference $k_e$ may be detected by a feedback detector. A noise correction signal with the time difference may be $A_t S_n(n-\Delta T-k_e)$.

In some embodiments, the noise correction signal may include a plurality of sub-band noise correction signals. For example, the noise correction signal with phase compensation may be represented as $\Sigma_{i=1}^{N} A_i S'_i(n-\Delta T-k_e)$.

In some embodiments, in order to achieve a desired destructive interference between the noise A and the anti-noise sound B at the cochlea 207, a modulation operation may be performed by the data processing device 110 in generating a noise correction signal according to Equation (6) as below:

$$A_t S'_i(n-\Delta T-k_e) H_{BC} + S_n(n) H_{AC} = 0. \tag{6}$$

Figure 3A:
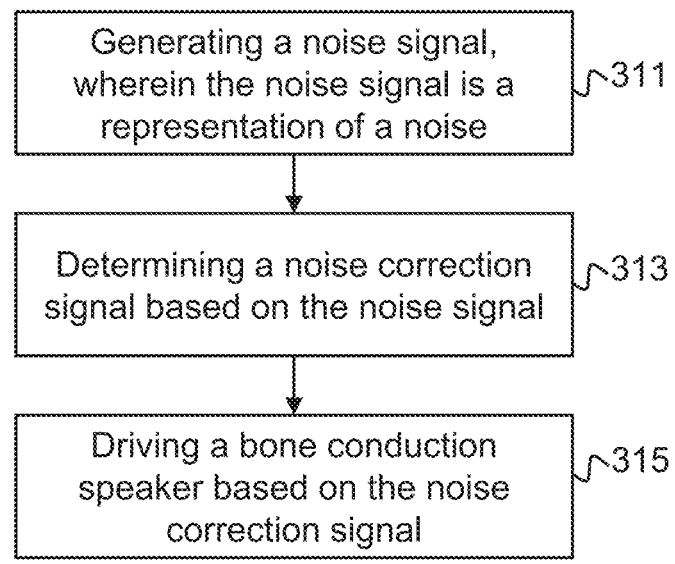
FIG. 3A is a flowchart illustrating an exemplary process for active noise control according to some embodiments of the present disclosure.

FIG. 3A is a flowchart illustrating an exemplary process 300A for active noise control according to some embodiments of the present disclosure. Process 300A may be performed by one or more components of the noise control system 100, for example, the detector 120, the data processing device 110, and the speaker 130.

In 311, a noise signal may be generated in response to a detected noise to be reduced. The noise signal may be a representation of the noise. In some embodiments, the detection of the noise may be performed by the detector 120. The noise signal may be a digital signal or an analog signal. The noise signal may be a broadband signal or a narrowband signal. The noise signal may be a full-band noise signal that has the same frequency band as the noise. Alternatively, the noise signal may include a plurality of sub-band noise signals. Each of the plurality of sub-band noise signals may have a sub-band of the frequency band of the noise. More descriptions regarding the sub-band noise signal(s) may be found elsewhere in the present disclosure. See, e.g., FIG. 9 and relevant descriptions thereof.

In some embodiments, the noise signal may be a primary noise signal representing a primary noise (e.g., an ambient noise around the ear of a user). The primary noise signal may be a feedforward noise signal corresponding to a feedforward noise control path (which will be described in detail in connection with FIGS. 8-13). The primary noise signal may be generated by an audio sensor (e.g., an audio sensor 510 as shown in FIGS. 5-7). Alternatively, the noise signal may be a residual noise signal representing a residual noise. The residual noise signal may be a feedback noise signal corresponding to a feedback noise control path (which will be described in detail in connection with FIGS. 8-12). The residual noise signal may be generated by a feedback signal detector (e.g., a feedback signal detector 530 as shown in FIGS. 5 and 6). Alternatively, the noise signal may be a combined signal of the primary noise signal and the residual noise signal, which represents both the primary noise and the residual noise.

In 313, a noise correction signal may be determined based on the noise signal.

In some embodiments, the determination of the noise correction signal may be performed by the data processing device 110. One or more operations, such as phase modulation and amplitude modulation, may be performed to determine the noise correction signal. Optionally, one or more algorithms may be used to determine the noise correction signal. For example, the Least Mean Square (LMS) algorithm, the normalized Least Mean Square (NLMS) algorithm, the Filtered-x Least Mean Square (FxLMS) algorithm, the Filtered-u Least Mean Square (FuLMS) algorithm, or the like, or any combination thereof, may be used in generating the noise correction signal.

Figure 3B:
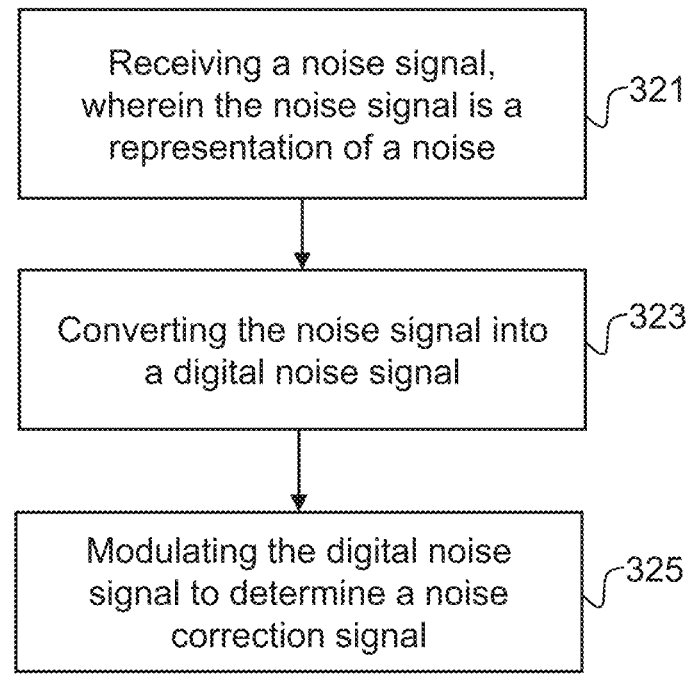
FIG. 3B is a flowchart illustrating an exemplary process for active noise control according to some embodiments of the present disclosure.

In some embodiments, the noise correction signal may include a primary noise correction signal and/or a residual noise correction signal. The primary noise correction signal may be used to reduce or cancel the primary noise. The residual noise correction signal may be used to reduce or cancel the residual noise. The primary noise correction signal and/or the residual noise correction signal may be determined by performing process 300B as shown in FIG. 3B. In some embodiments, the noise correction signal may include a plurality of sub-band noise correction signals. More descriptions regarding the plurality of sub-band noise correction signals may be found elsewhere in the present disclosure. See, e.g., FIG. 9 and relevant descriptions thereof.

In 315, a bone conduction speaker (e.g., the speaker 130) may be driven based on the noise correction signal. For example, the bone conduction speaker may generate a bone conduction sound for reducing or canceling the primary noise and/or the residual noise. The bone conduction sound may be transmitted to the user's inner ear via, for example, a bone conduction pathway (e.g., the bone conduction pathway 221 as shown in FIGS. 2A and 2B).

FIG. 3B is a flowchart illustrating an exemplary process 300B for active noise control according to some embodiments of the present disclosure. In some embodiments, the process 300B may be performed by a feedforward signal processor 521 (e.g., 521a, 521b, 521c, 521d, 521e, and 521f) and/or a feedback signal processor 522 (e.g., 522a, 522d, and 522e) as described elsewhere in this disclosure (e.g., FIGS. 8-13 and the relevant descriptions).

In 321, a noise signal may be received. The noise signal may be a representation of a primary noise and/or a residual noise. The noise signal may be detected by a detector (e.g., the detector 120). The noise signal may be an analog signal or a digital signal. The noise signal may be similar to that described in connection with 311 in FIG. 3A, and the descriptions thereof are not repeated here.

In 323, the noise signal may be converted into a digital noise signal if the noise signal is an analog signal.

The conversion may be performed by an A/D converter, for example, one of A/D converters 810, 820, and 1370 as shown in FIGS. 8-10 and 12-13. A sampling frequency $f_s$, of the A/D converter may be greater than $2W_a$, wherein $W_a$ refers to a maximum frequency of the noise signal. In some embodiments, the sampling frequency $f_s$ may be determined according to Formula (7) as below:

$$f_s > kW_a, \quad (7)$$

where k refers to any positive number, such as 1.5, 2.0, 2.5, 3.5, or 5.0.

In 325, a noise correction signal may be determined based on a modulation of the digital noise signal.

In some embodiments, the determination of the noise correction signal may be performed by a data processing device 110 (e.g., 110A, 110B, 110C, 110D, 110E, and 110F) as described elsewhere in this disclosure. For example, a modulator of the data processing device 110 may modulate the digital noise signal to determine the noise correction signal. The modulation of the digital noise signal may include amplitude modulation, phase modulation (e.g., a phase inversion and/or a phase compensation), or the like, or a combination thereof. In some embodiments, the modulation may be performed based on a phase adjustment coefficient (e.g., $\Delta T$) and/or an amplitude adjustment coefficient according to equations (4)-(6). In some embodiments, operation 323 may be omitted if the noise signal received in 321 is a digital noise signal. In 325, the noise correction signal may be generated by modulating the noise signal.

FIG. 4 is a schematic diagram illustrating an exemplary noise signal 411 and an exemplary noise correction signal 413 according to some embodiments of the present disclosure.

As shown in FIG. 4, the noise correction signal 413 (e.g., $S'_n(n)$) may have the same amplitude as but a reversed phase to the noise signal 411 (e.g., $S_n(n)$). As used herein, "a reversed phase" refers to under a particular frequency, the maximum value of noise correction signal 413 corresponds to the minimum value of the noise signal 411. Ideally, the noise signal 411 and the noise correction signal 413 may neutralize each other due to destructive interference.

FIG. 5 is a schematic diagram illustrating an exemplary noise control system 500 according to some embodiments of the present disclosure. The noise control system 500 may include an audio sensor 510, a data processing device 110, a feedback signal detector 530, and a bone conduction speaker 540. The data processing device 110 may include a feedforward signal processor 521 and a feedback signal processor 522. The noise control system 500 may be configured to reduce or cancel a noise. The noise control system 500 may be an exemplary embodiment of the noise control system 100.

The feedforward signal processor 521 may form a feedforward noise control path configured to reduce a primary noise 590 (e.g., ambient noise of the user 550). The audio sensor 510 may be configured to detect the primary noise 590 and generate a primary noise signal representing the primary noise 590. The primary noise signal may be also referred to as a feedforward noise signal corresponding to the feedforward noise control path. In some embodiments, the audio sensor 510 may be placed near an ear pinna of a user to detect an ambient noise that enters an ear of the user.

In some embodiments, the primary noise signal may be an electrical signal in the time domain or the frequency domain. The primary noise signal may include a full-band primary noise signal and/or a sub-band primary noise signal. In some embodiments, the primary noise signal may include a plurality of sub-band primary noise signals. For example, the audio sensor 510 may include one or more acoustic-electric transducers, each of which may be configured to generate one of the sub-band primary noise signals. As another example, the audio sensor 510 may generate a full-band primary noise signal and divide the full-band primary noise signal into a plurality of sub-band primary noise signals with different frequency bands according to a sub-band decomposition technology.

Each of the plurality of sub-band primary noise signals may be corresponding to a sub-band of the primary noise. For a plurality of sub-band primary noises of the primary noise, their corresponding transfer functions may be the same or different. In the noise control system 100, a first transfer function of a sub-band primary noise transmitted in a first medium and a second transfer function of the same sub-band primary noise transmitted in a second medium may be the same or different. For different frequency of sounds, their transfer functions of air conduction pathway (or bone conduction pathway) may be different. In some embodiments, transfer functions for noises of different frequencies (i.e., different sub-band primary signals) may be different. In some embodiments, the noise control system 100 may cancel or reduce noise having a practicality frequency.

The feedforward signal processor 521 may be configured to process data associated with the feedforward noise control path. For example, the feedforward signal processor 521 may generate a primary noise correction signal for reducing the primary noise based on the primary noise signal. The primary noise correction signal may also be referred to as a feedforward noise correction signal. In some embodiments, the feedforward signal processor 521 may include an A/D converter, a modulator, a filter, or the like, or any combination thereof.

The primary noise correction signal may be used as an input signal of the bone conduction speaker 540 to determine a primary anti-noise sound for reducing the primary noise. The primary anti-noise sound may be transmitted through the bone conduction pathway to the cochlea 207 of the user 550.

In some embodiments, a major part of the primary noise may be reduced or canceled by the primary anti-noise sound. However, a residual noise may exist due to, for example, a difference between the air conduction transfer function and the bone conduction transfer function, a physiological structure of an ear of the user, or the like. For example, the user 550 may detect the residual noise as a signal $I_g$. In some other embodiments, the residual noises corresponding to the same primary noise may be different for different users. That may due to that, for different users, the transfer functions of the air conduction pathway (and/or bone conduction pathway) may be different. In such cases, a feedback noise reduction system may be needed to reduce the residual noise.

The feedback signal processor 522 and feedback signal detector 530 may form a feedback noise control path configured to reduce the residual noise. The residual noise may refer to a noise that still exists at the cochlea 207 of the user 550 after the interference between the primary noise transmitted through the air conduction pathway and the primary anti-noise sound transmitted through the bone conduction pathway.

The feedback signal detector 530 may be configured to detect the residual noise and generate a residual noise signal representing the residual noise. In some embodiments, the feedback signal detector 530 may include any device that can detect the residual noise. For example, the feedback signal detector 530 may be a biological monitoring device (e.g., a brain wave monitoring device, a nerve monitoring device) that may detect the residual noise by measuring biological characteristic(s) of the user.

In some embodiments, the residual noise signal may be an electrical signal, such as an analog signal or a digital signal. Optionally, if the residual noise signal is an analog signal (denoted as $e_n(t)$), the feedback signal detector 530 may be coupled to a sampling module that is configured to generate a digital residual noise signal $e_n(n)$ by sampling the analogy residual noise signal $e_n(t)$. The sampling frequency of the sampling module may be greater than $2W_r$, wherein $W_r$ refers to a maximum frequency of the analog residual noise signal $e_n(t)$.

The feedback signal processor 522 may be configured to process data associated with the feedback noise control path. For example, the feedback signal processor 522 may generate a residual noise correction signal. The residual noise correction signal may be configured to reduce or cancel the residual noise. In some embodiments, the feedback signal processor 522 may include an A/D converter, a modulator, a filter, or the like, or a combination thereof.

For example, the feedback signal processor 522 may be configured to determine a residual noise correction signal $e'_n(n)$ by performing a phase inversion on the digital residual noise signal $e_n(n)$. The residual noise correction signal $e'_n(n)$ may be used to cancel or reduce the noise signal $e_n(n)$ through destructive interference.

In some embodiments, the residual noise correction signal may be determined by performing a phase inversion operation and amplitude modulation on the residual noise signal without performing a phase compensation. The generation of the residual noise correction signal by the feedback signal processor 522 may be performed in a similar manner as the generation of the primary noise correction signal by the feedforward signal processor 521. The residual noise correction signal may be a full-band residual correction noise signal having the same frequency band as the residual noise. For example, the residual noise correction signal may be represented as $A_b e'_n(n)$, where $A_b$ refers to an amplitude adjustment coefficient of the feedback noise control path. For another example, the residual noise correction signal may include a plurality of sub-band residual correction noise signals, each of which has a sub-band frequency of the residual noise. The residual noise correction signal may be represented as $\Sigma_{i=1}^{N} A_i e'_i(n)$, where $A_i$ refers to an amplitude adjustment coefficient for an $it^{th}$ sub-band residual noise signal, N refers to a number of the sub-band residual noise signal, and $e'_i(n)$ refers to a signal having the same amplitude as but an inverted phase (as known as antiphase) to an $it^{th}$ sub-band residual noise signal $e_i(n)$.

The bone conduction speaker 540 may be an embodiment of the speaker 130 as shown in FIG. 1 configured to output a sound based on the primary noise correction signal and/or the residual noise correction signal. For example, the bone conduction speaker 540 may generate the sound base on a combined signal of the primary noise correction signal and the residual noise correction signal. As another example, the bone conduction speaker 540 may generate a sound based on the primary noise correction signal and a sound based on the residual noise correction signal in sequence. The sound(s) outputted by the bone conduction speaker 540 may be transmitted to the cochlea 207 of the user 550 through the bone conduction pathway 221. The primary noise 590 may be transmitted to the cochlea 207 of the user 550 through the air conduction pathway 211. The sound(s) outputted by the bone conduction speaker 540 may interfere with the primary noise 590 at the cochlea 207 to reduce or cancel the primary noise 590.

FIG. 6 is a schematic diagram illustrating an exemplary noise control system 600 according to some embodiments of the present disclosure. The noise control system 600 may include a data processing device 110, a feedback signal detector 530, and a bone conduction speaker 540. The data processing device 110 may include a feedback signal processor 522. The noise control system 600 may be an exemplary embodiment of the noise control system 100.

The feedback signal detector 530 may generate a residual noise signal (e.g., $e_n(n)$, $e_n(t)$) represents a residual noise. The residual noise signal may be an electrical signal and transmitted to the feedback signal processor 522 for further processing. In some embodiments, the feedback signal detector 530 may be configured to determine a time difference $k_e$ as described elsewhere in the present disclosure (e.g., FIG. 2B and relevant descriptions thereof).

The feedback signal processor 522 may be configured to generate a residual noise correction signal (e.g., $e'_n(n)$) based on the residual noise signal (e.g., $e_n(n)$). For example, the feedback signal processor 522 may include an A/D converter, a modulator, a D/A converter, or the like, or any combination thereof. The A/D converter of the feedback signal processor 522 may be configured to convert an analog residual noise signal $e_n(t)$ to a digital residual noise signal $e_n(n)$. The sampling frequency of the A/D converter may be greater than two times of a maximum frequency of the analog residual noise signal $e_n(t)$. The modulator may be configured to perform a phase inversion on the digital residual noise signal $e_n(n)$ to generate the residual noise correction signal $e'_n(n)$. In some embodiments, the feedback signal processor 522 may determine the residual noise correction signal $e'_n(n)$ based on the digital residual noise signal $e_n(n)$ and $k_e$. The D/A converter may be configured to perform digital to an analog convention to convert the residual noise correction signal $e'_n(n)$ into an analog residual noise correction signal $e'_n(t)$. The analog residual noise correction signal $e'_n(t)$ may be used as an input signal of the bone conduction speaker 540. The bone conduction speaker 540 may be configured to determine an anti-noise sound for reducing or canceling the residual noise based on the analog residual noise correction signal $e'_n(t)$.

FIG. 7 is a schematic diagram illustrating an exemplary noise control system 700 according to some embodiments of the present disclosure. The noise control system 700 may include an audio sensor 510, a data processing device 110, and a bone conduction speaker 540. The data processing device 110 may include a feedforward signal processor 521. The noise control system 700 may be an exemplary embodiment of the noise control system 100.

The audio sensor 510 may detect a primary noise 590 and generate a primary noise signal representing the primary noise 590.

The feedforward signal processor 521 may be configured to generate a primary noise correction signal based on the primary noise signal.

The primary noise correction signal may be used as an input of the bone conduction speaker 540 to generate an anti-noise sound for suppressing the primary noise. The anti-noise sound may be transmitted to an inner ear of the user 550 via a bone conduction pathway, and the primary noise 590 may be transmitted to the inner ear of the user 550 via an air conduction pathway.

It should be noted that the above descriptions of the noise control systems 500, 600 and 700 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, a noise control system (e.g., anyone of the noise control systems 500, 600 and 700) may include one or more additional components. Additionally or alternatively, one or more components of the noise control system described above may be omitted. For example, in the noise control system 500, one of the feedforward signal processor 521 and the feedback signal processor 522 may be omitted. As another example, two or more components of the noise control system may be integrated into a single component. Merely by way of example, in the noise control system 500, the A/D convertor of the feedforward signal processor 521 may be integrated into the audio sensor 510, and/or the D/A convertor of the data processing device 110 may be integrated into the bone conduction speaker 540.

FIGS. 8-10 and 12-13 are schematic diagrams illustrating exemplary data processing devices 110A-C and 110E-F according to some embodiments of the present disclosure. Each of the data processing devices 110A-C and 110E-F may be configured to obtain and process a noise signal. The noise signal may be a digital signal or analog signal. For illustration purposes, unless stated otherwise or obvious from the context, the present disclosure is described with reference to a noise signal in the form of a digital signal, and not intended to limit the scope of the present disclosure. Each of the data processing devices 110A-C and 110E-F may include one or more components for processing digital signals. It should be understood that this is not indented to be limiting. The noise signal may be an analog signal, and a data processing device may include one or more components for processing analog signals as described elsewhere in this disclosure (e.g., FIG. 11 and the relevant descriptions).

Figure 8:
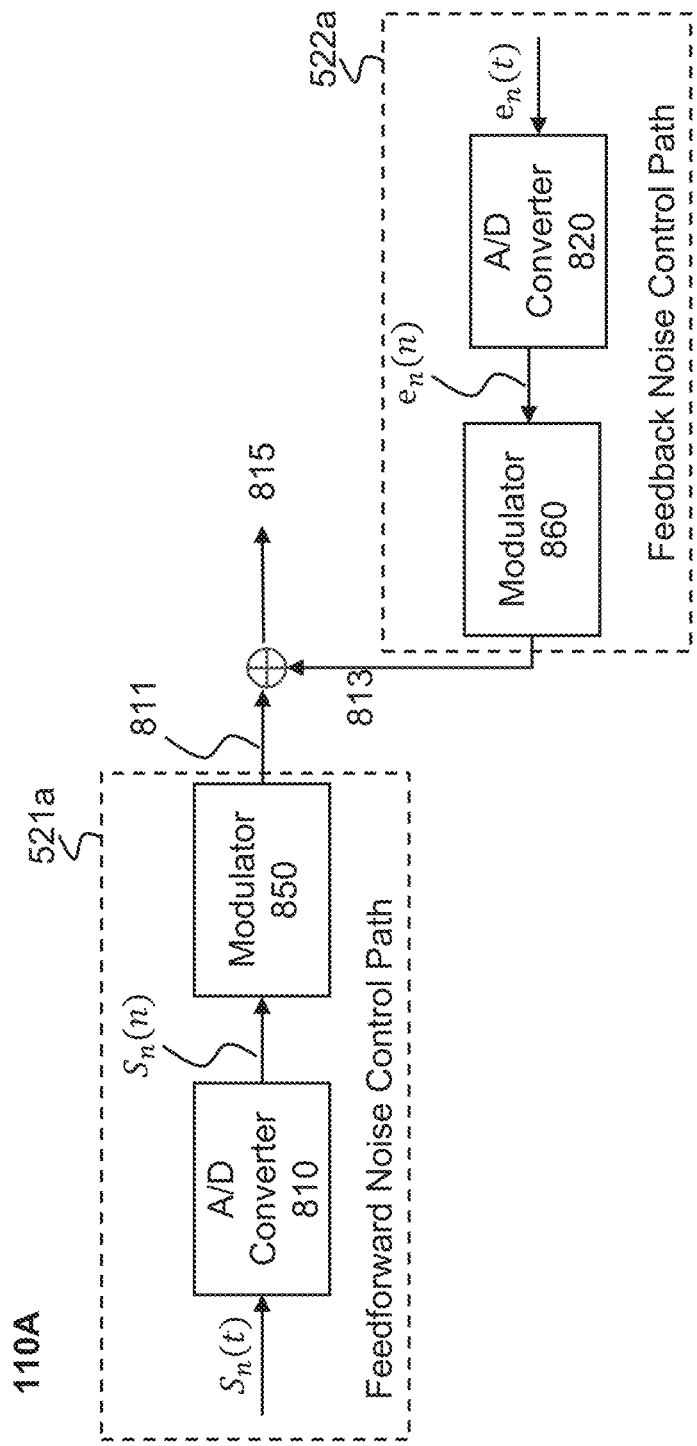
FIG. 8 is a schematic diagram illustrating an exemplary data processing device according to some embodiments of the present disclosure.

FIG. 8 is a schematic diagram illustrating an exemplary data processing device 110A according to some embodiments of the present disclosure. The data processing device 110A may include a feedforward signal processor 521a and a feedback signal processor 522a. The data processing device 110A may be configured to determine a noise correction signal 815 for reducing a primary noise and a residual noise. The feedforward signal processor 521a and the feedback signal processor 522a may be exemplary embodiments of the feedforward signal processor 521 and the feedback signal processor 522, respectively.

The feedforward signal processor 521a may be configured to receive an analog primary noise signal $S_n(t)$ and determine a primary noise correction signal 811 based on the analog primary noise signal $S_n(t)$ in a feedforward noise control path. The analog primary noise signal $S_n(t)$ may be an analog electrical signal representing the primary noise (e.g., an ambient noise). The feedforward signal processor 521a may include an A/D converter 810 and a modulator 850.

The A/D converter 810 may be configured to convert the analog primary noise signal $S_n(t)$ into a digital primary noise signal $S_n(n)$. The sampling frequency of the A/D converter 810 may be greater than $2W_{max}$, wherein $W_{max}$ refers to the maximum frequency of the analog primary noise signal $S_n(t)$. The modulator 850 may be configured to determine the primary noise correction signal 811 based on the digital primary noise signal $S_n(n)$. In some embodiments, the modulator 850 may include a phase modulator for performing phase modulation and an amplitude modulator for performing amplitude modulation.

The phase modulation may be performed by the phase modulator. For example, the phase modulator may perform a phase inversion and optionally a phase compensation on the digital primary noise signal $S_n(n)$ to generate a signal $S'_n(n-\Delta T)$, wherein $\Delta T$ refers to a time difference between a first time for an air conduction sound to transmit to the cochlea 207 along the air conduction pathway 211 and a second time for a bone conduction sound to be transmitted to the cochlea 207 along the bone conduction pathway 221. The amplitude modulator may perform amplitude modulation on the signal $S'_n(n-\Delta T)$ according to an amplitude adjustment coefficient $A_t$ to generate a primary noise correction signal $A_t S'_n(n-\Delta T)$.

The feedback signal processor 522a may be configured to receive a residual noise signal and determine a residual noise correction signal 813 (e.g., $A_b e'_n(n)$) based on the residual noise signal in a feedback noise control path. The residual noise signal may be an electrical signal representing a residual noise. The feedback signal processor 522a may include an A/D converter 820 and a modulator 860. The modulator 860 may include a phase modulator and/or an amplitude modulator. The modulator 860 may have similar functions to the modulator 850 as described above.

In some embodiments, the modulator 850 and/or the modulator 860 may include a sub-band modulator group. More descriptions regarding the sub-band modulator group may be found elsewhere in the present disclosure. See, e.g., FIG. 9 and relevant descriptions thereof.

The data processing device 110A may combine the primary noise correction signal 811 (e.g., $A_t S'_n(n-\Delta T)$) and the residual noise correction signal 813 (e.g., $A_b e'_n(n)$) to determine a noise correction signal 815 (e.g., $A_t S'_n(n-\Delta T)+A_b e'_n(n)$).

In some embodiments, the noise correction signal 815 determined by the data processing device 110A may be a full-band signal. The noise correction signal 815 may be determined according to Equation (8) as below:

$$S_f(n)=A_t S'_n(n-\Delta T)+A_b e'(n) \tag{8}$$

In some embodiments, the data processing device 110A may respectively output the feedforward noise correction signal 811 and the feedback noise correction signal 813 through two communication channels.

Figure 9:
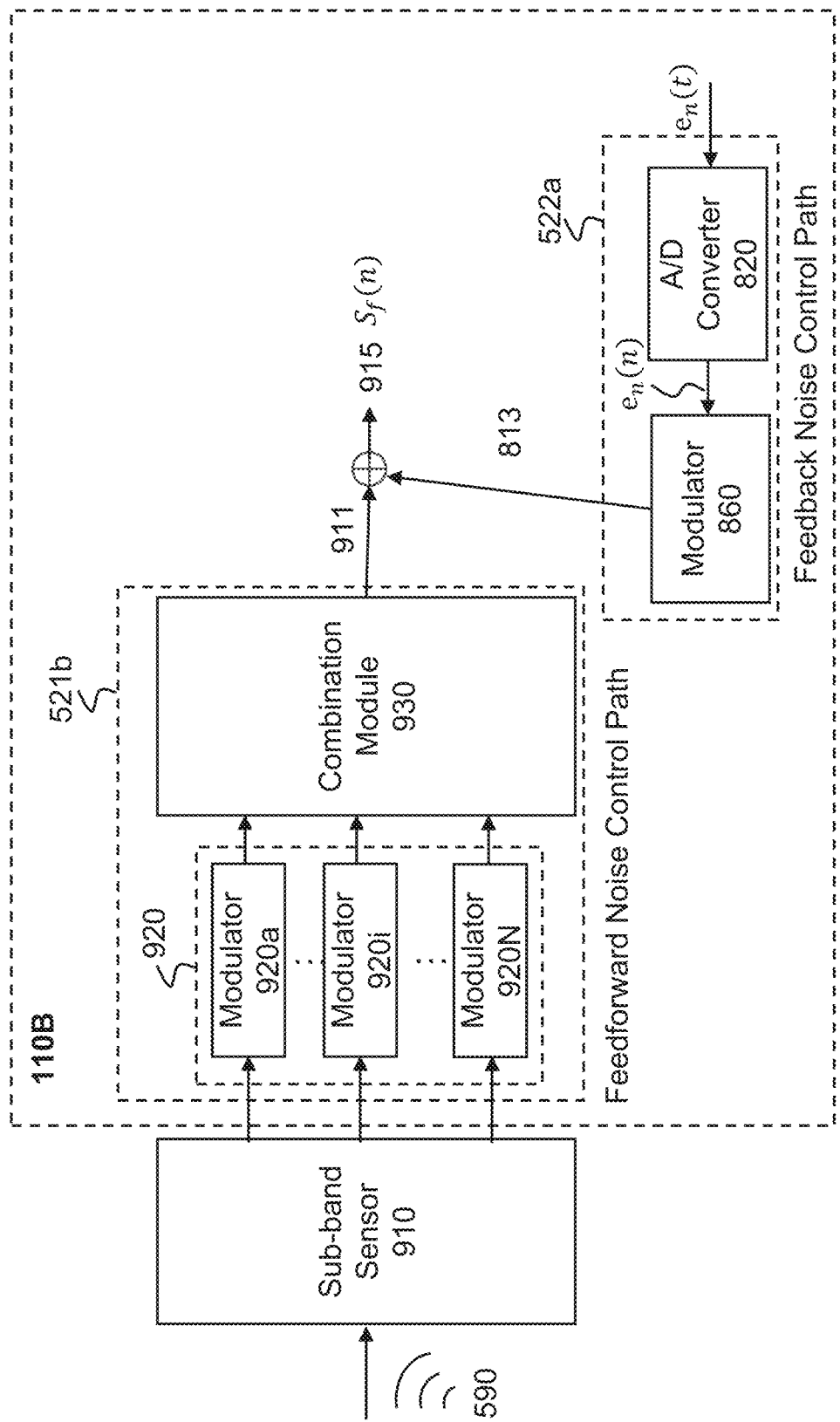
FIG. 9 is a schematic diagram illustrating an exemplary data processing device according to some embodiments of the present disclosure.

FIG. 9 is a schematic diagram illustrating an exemplary data processing device 110B according to some embodiments of the present disclosure. The data processing device 110B may be similar to the data processing device 110A as described in connection with FIG. 8, except for certain components or features. As shown in FIG. 9, the data processing device 110B may include a feedforward signal processor 521b and the feedback signal processor 522a. The feedforward signal processor 521b may be coupled with a sub-band sensor 910 (which is an exemplary embodiment of the audio sensor 510 as described in connection with FIG. 5).

The sub-band sensor 910 may be configured to detect a primary noise 590 and determine a plurality of sub-band primary noise signals (e.g., $S_1(n), S_2(n), \ldots, S_N(n)$) representing the primary noise 590. The primary noise 590 may be an audio signal having a certain frequency band. A sub-band primary noise signal may refer to a signal having a frequency band narrower than and within the frequency band of the primary noise 590. For example, the primary noise 590 may have a frequency band of 10-30,000 HZ. The frequency band of a sub-band primary noise signal may be 100-200 HZ, which is within the frequency band of the primary noise 590. The transmission of a sound through bones (e.g., an amplitude change of the sound during the transmission) may be influenced by the frequency of the sound. For sounds of different frequencies, their transfer functions in a bone conduction path may be different. A sub-band noise reduction technology may be used to improve the noise reduction effect.

In some embodiments, at least two of the sub-band primary noise signals may have different frequency bands. Optionally, each of the sub-band primary noise signals may have a distinctive frequency band different from the frequency band(s) of the other sub-band primary noise signal (s). Different sub-band noise signals may have the same frequency bandwidth or different frequency bandwidths. In some embodiments, an overlap between the frequency bands of a pair of adjacent sub-band noise signals in the frequency domain may be avoided, so as to improve the noise reduction effect. As used herein, two sub-band noise signal whose center frequencies are adjacent to each other among the sub-band noise signals may be regarded as being adjacent to each other in the frequency domain.

In some embodiments, the spectrum of a first sub-band primary noise signal and a second sub-band primary noise signal may intersect at a half-power point of the first sub-band primary noise signal and/or a half-power point of the second sub-band primary noise signal. A half power point of a certain signal may refer to a frequency point with a specific attenuation of power level (e.g., -3 dB). In some embodiments, a combination of the frequency bands of the sub-band primary noise signals may cover the frequency band of the primary noise 590. The frequency bandwidths of different sub-band primary noise signals may be the same as or different from each other. Additionally or alternatively, an overlap between the frequency bands of a pair of adjacent sub-band primary noise signals in the frequency domain may be avoided.

In some embodiments, the sub-band sensor 910 may be configured to convert the primary noise into an electrical signal and divide the electrical signal into the sub-band primary noise signals. For example, the sub-band sensor 910 may include an acoustic-electric transducer configured to convert the primary noise into an electrical signal, and a band-dividing module configured to divide the electrical signal into the sub-band primary noise signals. For example, the band-dividing module may include a plurality of band-pass filters. Each of the band-pass filters may have a unique frequency response and be configured to generate one of the sub-band primary noise signals by processing the electrical signal. The band-pass filters may include an active band-pass filter and/or a passive band-pass filter. The band-pass filters may include a Butterworth filter, a Chebyshev filter, or a Cauer filter, or the like, or any combination thereof.

In some embodiments, the sub-band sensor 910 may include a plurality of acoustic-electric transducers. Each of the acoustic-electric transducers may have a unique frequency response and configured to generate a sub-band primary noise signal by processing the primary noise. Descriptions regarding the generation of a sub-band noise signal may be found in PCT Application No. PCT/CN2019/109301, entitled "SYSTEMS AND METHODS FOR NOISE REDUCTION USING SUB-BAND NOISE REDUCTION TECHNIQUE" filed on Sep. 30, 2019, the contents of which are hereby incorporated by reference.

The feedforward signal processor 521b may be configured to receive the sub-band primary noise signals from the sub-band sensor 910 and generate a primary noise correction signal 911 for reducing the primary noise 590. For example, the feedforward signal processor 521b may include a modulator group 920 and a combination module 930. In some embodiments, the sub-band primary noise signals may be transmitted from the sub-band sensor 910 to the modulator group 920 through parallel transmitters. Optionally, a sub-band primary noise signal may be transmitted via a transmitter according to a certain communication protocol for transmitting digital signals. Exemplary communication protocols may include AES3 (audio engineering society), AES/EBU (European broadcast union))、EBU (European broadcast union), ADAT (Automatic Data Accumulator and Transfer), I2S (Inter—IC Sound), TDM (Time Division Multiplexing), MIDI(Musical Instrument Digital Interface), CobraNet, Ethernet AVB (Ethernet Audio/VideoBridging), Dante, ITU(International Telecommunication Union)-T G.728, ITU-T G.711, ITU-T G.722, ITU-T G.722.1, ITU-T G.722.1 Annex C. AAC (Advanced Audio Coding)-LD, or the like, or a combination thereof. In some alternative embodiments, the sub-band primary noise signals may be processed to a single-channel signal using, e.g., a frequency-division multiplexing technique, and transmitted to the modulator group 920.

The modulator group 920 may include a plurality of modulators 920a-920N. The number (or count) of the modulators 920a-920N (i.e., N) may be set base on requirements of the noise control system 100. For example, the number of the modulators 920a-920N may be equal to any positive integer greater than 1, such as 5, 10, 15, or the like. In some embodiments, the number (or count) of the modulators 920a-920N may be equal to the number (or count) of the sub-band primary noise signals generated by the sub-band sensor 910.

Each of the plurality of modulators 920a-920N may be configured to receive one of the sub-band primary noise signals from the sub-band sensor 910 and generate a corresponding sub-band primary noise correction signal by modulating the received sub-band primary noise signal. Taking the modulator 920i for instance, the modulation performed by the modulator 920i may include amplitude modulation and/or phase modulation (e.g., a phase reversal and/or a phase compensation) on the corresponding sub-band primary noise signal $S_i(n)$. In some embodiments, the phase modulation and the amplitude modulation may be performed in sequence or simultaneously on the sub-band primary noise signal $S_i(n)$. For example, the modulator 920i may perform amplitude modulation on the $S_i(n)$ based on an amplitude adjustment coefficient $A_i$ corresponding to the $S_i(n)$ to generate a signal $A_iS_i(n)$, where $A_i=H_{ACi}/H_{BCi}$, $H_{ACi}$ refers to a transfer function of the air conduction pathway 211 for an $i^{th}$ sub-band primary noise signal, and $H_{BCi}$ refers to a transfer function of the bone conduction pathway 221 of the $i^{th}$ sub-band primary noise signal. The modulator 920i may further perform a phase inversion on the signal $A_iS_i(n)$ to generate a corresponding sub-band primary noise correction signal $A_iS'_i(n)$.

As another example, the modulator 920i may perform the amplitude modulation, the phase inversion, and a phase compensation on the sub-band primary noise signal $S_i(n)$ to determine the corresponding sub-band primary noise correction signal. For example, the sub-band primary noise correction signal determined by the modulator 920i may be represented as $A_iS'_i(n-\Delta T)$, wherein $\Delta T$ refers to a time difference between a first time for an air conduction sound to transmit to the cochlea 207 along the air conduction pathway 211 and a second time for a bone conduction sound to transmit to the same cochlea 207 along the bone conduction pathway 221 as described in connection with FIG. 2B.

The combination module 930 may be configured to combine the plurality of sub-band primary noise correction signals generated by the modulator group 920 to generate the primary noise correction signal 911. For example, the primary noise correction signal 911 may be represented as $\Sigma_{i=1}^{N}A_iS'_i(n)$. As another example, the primary noise correction signal 911 may be represented as $\Sigma_{i=1}^{N}A_iS'_i(n-\Delta T)$.

The combination module 930 may include any component that can combine a plurality of signals. For example, the combination module 930 may generate a mixed-signal (i.e., the primary noise correction signal) according to a signal combination technique, such as a frequency division multiplexing technique. In some alternative embodiments, the combination module 930 may be an independent component or part of a component of the feedforward signal processor 521b. Alternatively, the combination module 930 may be omitted and the sub-band primary noise correction signals may be transmitted in parallel for output.

The feedback signal processor 522a may be configured to receive a residual noise signal (e.g., $e_n(n)$, $e_n(t)$) and determine a residual noise correction signal 813 (e.g., $A_be'_n(n)$) based on the residual noise signal in a feedback noise control path as described in connection with FIG. 8.

In some embodiments, a noise correction signal 915 (e.g., $S_f(n)$) may be generated by combining the primary noise correction signal 911 and the residual noise correction signal 813.

For example, the noise correction signal 915 may be determined according to Equation (9) as below:

$$S_f(n)=\Sigma_{i=1}^{N}A_iS_i(n-\Delta T)+A_be'(n). \tag{9}$$

In some embodiments, the noise correction signal 915 may be a digital signal, an analog signal, or a pulse width modulation (PWM) signal. The noise correction signal 915 may be transmitted to another component (e.g., a bone conduction speaker) for output. In some embodiments, the data processing device 110B may output the primary noise correction signal 911 and the residual noise correction signal 813, respectively, through two communication channels.

Figure 10:
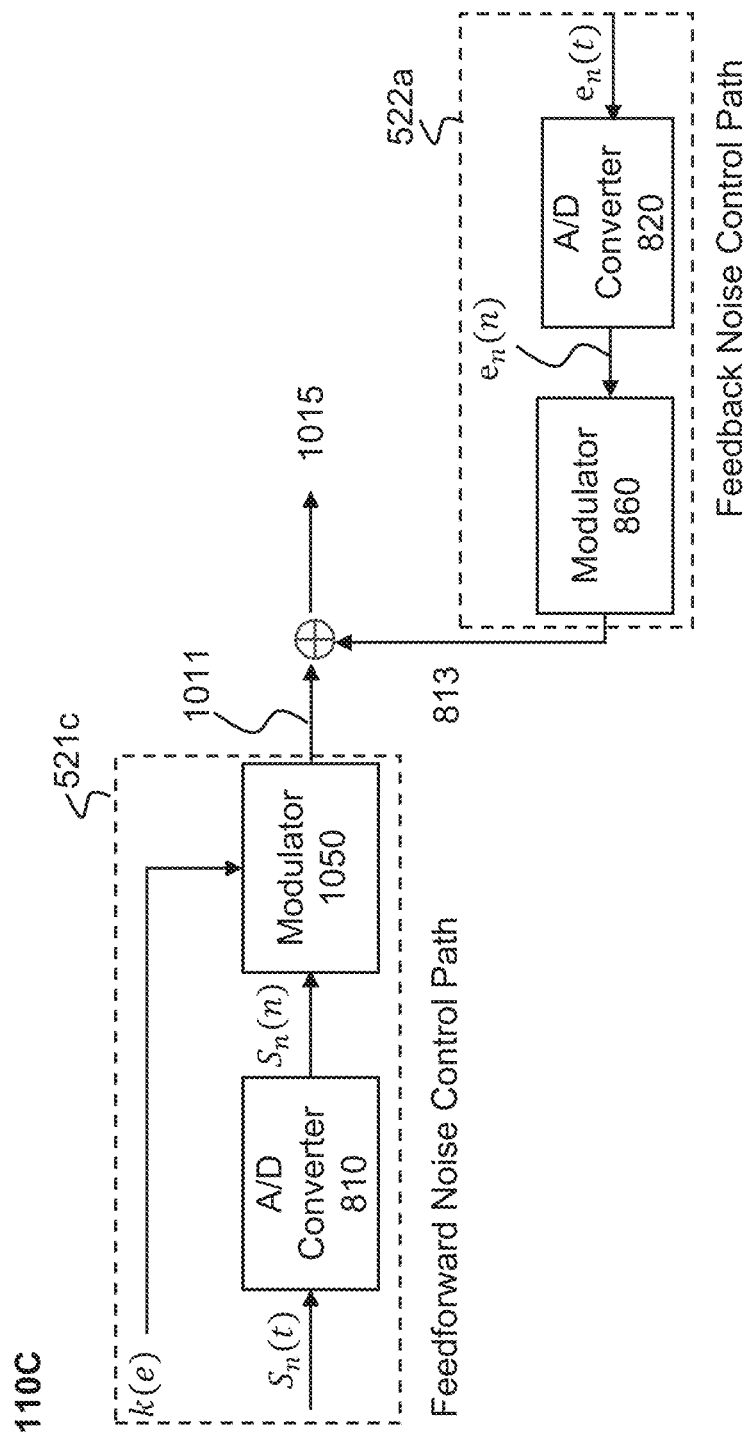
FIG. 10 is a schematic diagram illustrating an exemplary data processing device according to some embodiments of the present disclosure.

FIG. 10 is a schematic diagram illustrating an exemplary data processing device 110C according to some embodiments of the present disclosure. The data processing device 110C may be similar to the data processing device 110A as described in connection with FIG. 8, except for certain components or features. As shown in FIG. 10, the data processing device 110C may include a feedforward signal processor 521c and the feedback signal processor 522a. The data processing device 110C may be configured to determine a noise correction signal 1015.

The feedforward signal processor 521c may be configured to receive a primary noise signal representing a primary noise, and generate a primary noise correction signal 1011 for reducing the primary noise based on the primary noise signal in a feedforward noise control path. The noise signal may be a full-band signal or a sub-band signal. For example, the feedforward signal processor 521c may include an A/D converter 810 and a modulator 1050. The feedforward signal processor 521c may be an embodiment of the feedforward signal processor 521.

For example, the primary noise signal may be an analog primary noise signal $S_n(t)$. The A/D converter 810 may be configured to convert the analog primary noise signal $S_n(t)$ into a digital primary noise signal $S_n(n)$ as described in connection with FIGS. 3B and 8.

The modulator 1050 may be configured to determine the primary noise correction signal 1011 based on the digital primary noise signal $S_n(n)$. In some embodiments, the modulator 1050 may include a phase modulator for performing phase modulation and an amplitude modulator for performing amplitude modulation.

For example, the phase modulator may perform a phase inversion and optionally a phase compensation on the digital primary noise signal $S_n(n)$ to generate a signal $S'_n(n-\Delta T-k_e)$, wherein $k_e$ refers to a time difference between a reference value of a sound transmission time through a bone conduction pathway. More descriptions regarding the time difference $k_e$ may be found elsewhere in the present disclosure. See, e.g., FIG. 2B and relevant descriptions thereof. The amplitude modulator may perform an amplitude modulation on the signal $S'_n(n-\Delta T-k_e)$ according to an amplitude modulation coefficient $A_f$ to generate a primary noise correction signal $A_f S'_n(n-\Delta T-k_e)$.

The feedback signal processor 522a may be configured to receive a residual noise signal (e.g., $e_n(n)$, $e_n(t)$) and determine a residual noise correction signal 813 (e.g., $A_b e'_n(n)$) based on the residual noise signal in a feedback noise control path as described in connection with FIG. 8.

In some embodiments, the noise correction signal 1015 may be generated by combining the primary noise correction signal 1011 and the residual noise correction signal 813. For example, the noise correction signal 1015 may be represented as $A_f S'_n(n-\Delta T-k_e)+A_b e'_n(n)$. In some other embodiments, the data processing device 110C may respectively output the primary noise correction signal 1011 and the residual noise correction signal 813 through two communication channels.

Figure 11:
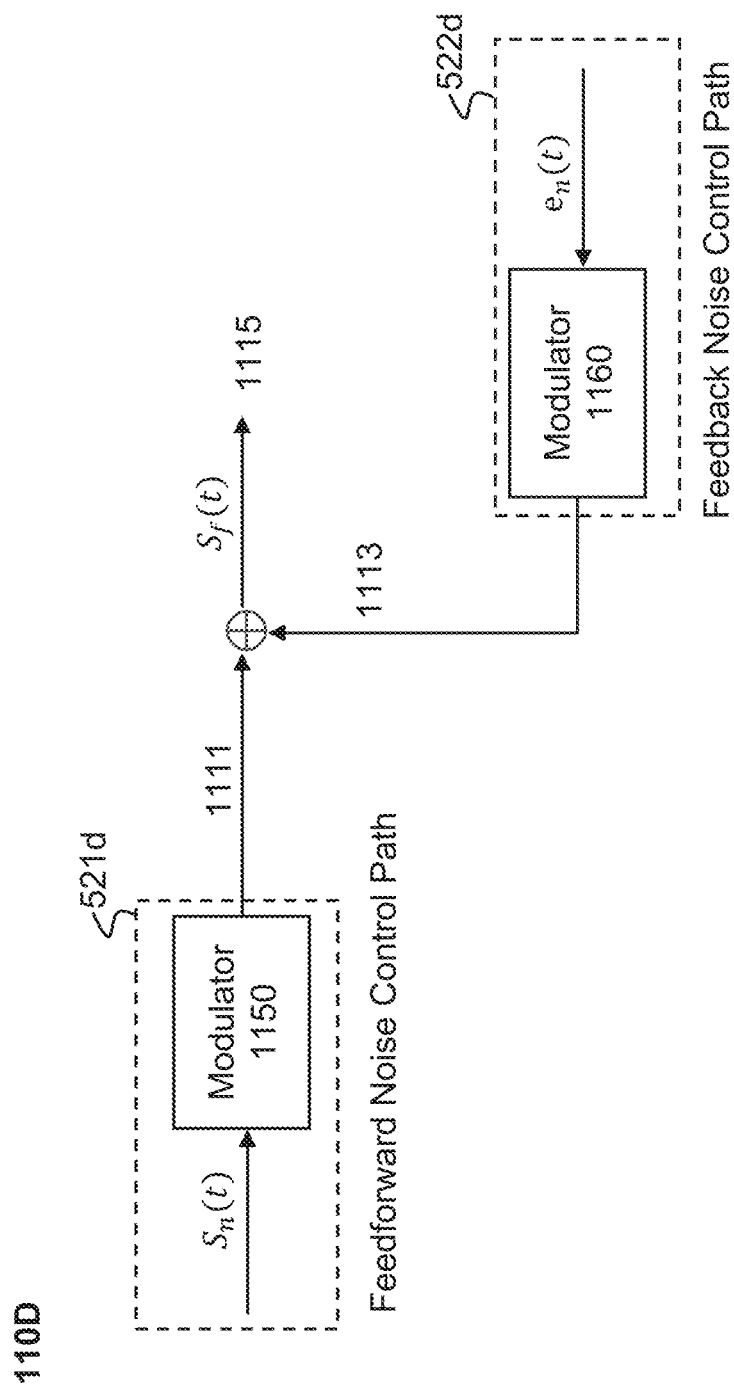
FIG. 11 is a schematic diagram illustrating an exemplary data processing device according to some embodiments of the present disclosure.

FIG. 11 is a schematic diagram illustrating an exemplary data processing device 110D according to some embodiments of the present disclosure. The data processing device 110D may include one or more analog signal processing components, such as a feedforward signal processor 521d and a feedback signal processor 522d as shown in FIG. 11. The data processing device 110D may be configured to determine a noise correction signal 1115 for reducing a primary noise and a residual noise.

The feedforward signal processor 521d may include a modulator 1150 configured to receive a primary noise signal $S_n(t)$ in a form of an analog electrical signal. The modulator 1150 may be further configured to generate a primary noise correction signal 1111 based on the primary noise signal $S_n(t)$. For example, the modulator 1150 may perform phase modulation and amplitude modulation on the primary noise signal $S_n(t)$ to generate a primary noise correction signal $A_f S'_n(t-\Delta T)$, where $A_f$ refers to an amplitude adjustment coefficient corresponding to the feedforward noise control path, and $\Delta T$ refers to a time difference between a first time for an air conduction sound to transmit to the cochlea 207 along the air conduction pathway 211 and a second time for a bone conduction sound to be transmitted to the same cochlea 207 along the bone conduction pathway 221.

The feedback signal processor 522d may be configured to determine a residual noise correction signal 1113 in a feedback noise control path. The feedback signal processor 522d may include a modulator 1160. The modulator 1160 may include a phase modulator and/or an amplitude modulator. The feedback signal processor 522d may be an embodiment of a feedback signal processor 522. For example, the phase modulator may perform a phase inverted operation on the residual noise signal $e_n(t)$ to generate a residual noise correction signal $e'_n(t)$.

In some embodiments, the modulator 1150 and/or the modulator 1160 may include one or more analog circuit components configured to perform phase modulation and/or amplitude modulation. For example, the modulator 1150 and/or the modulator 1160 may employ an amplifier (e.g., an inverting amplifier) to act as a phase and/or amplitude filter. The primary noise correction signal $A_f S'_n(t-\Delta T)$ may be determined using the amplifier or some other analog circuits. For another example, the data processing device 110D may employ a delay circuit (e.g., an all-pass inductor-capacitor (LC) circuit delay line, an active analog delay line), or some other analog circuits to perform a phase compensation on the primary noise signal.

In some embodiments, the modulator 1150 may include a first modulator group configured to receive a plurality of sub-band primary noise signals (in the form of analog signals) and generate a plurality of sub-band primary noise correction signals. Additionally or alternatively, the modulator 1160 may include a second modulator group configured to receive a plurality of sub-band residual noise signals (in the form of analog signals) and generate a plurality of sub-band residual noise correction signals. More descriptions regarding a modulator group may be found elsewhere in the present disclosure. See, e.g., FIG. 9 and relevant descriptions thereof.

In some embodiments, the data processing device 110D may combine the primary noise correction signal 1111 (e.g., $A_f S'_n(t-\Delta T)$) and the residual noise correction signal 1113 (e.g., $A_b e'_n(t)$) to determine a combined noise correction signal 1115 (e.g., $A_f S'_n(t-\Delta T)+A_b e'_n(t)$) for output. As another example, the data processing device 110D may output the primary noise correction signal 1111 and the residual noise correction signal 1113, respectively, through two communication channels.

By using analog signal processing component(s) as described above, the data processing device 110D may reduce the primary noise and the residual noise without performing A/D conversion and/or D/A conversion, thereby simplifying the data processing device 110D, reducing the load of chips, and improving the operation speed of noise reduction or cancellation. However, compared with the digital signal processing component(s), the analog signal processing component(s) may be less flexible and suitable for achieving self-adaption functions, and require more operational circuits.

Figure 12:
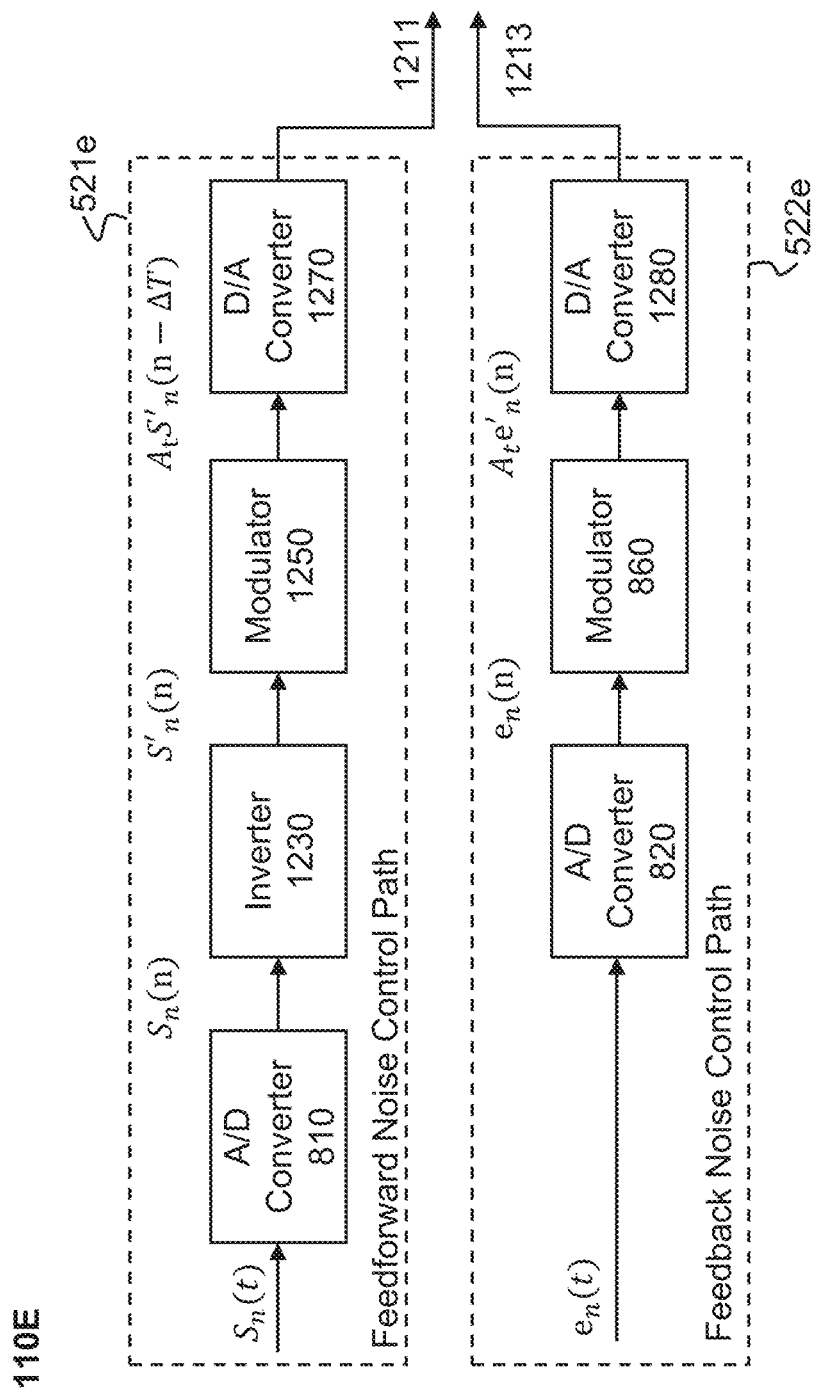
FIG. 12 is a schematic diagram illustrating an exemplary data processing device according to some embodiments of the present disclosure.

FIG. 12 is a schematic diagram illustrating an exemplary data processing device 110E according to some embodiments of the present disclosure. The data processing device 110E may include a feedforward signal processor 521e and a feedback signal processor 522e. The data processing device 110E may be configured to determine a primary noise correction signal 1211 for reducing a primary noise and a residual noise correction signal 1213 for reducing a residual noise.

The feedforward signal processor 521e may be configured to receive a primary noise signal (e.g., $S_n(t)$) and determine a primary noise correction signal 1211 (e.g., $S_{f1}(t)$) based on the primary noise signal in a feedforward noise control path. The primary noise signal may be a full-band signal or a sub-band signal. The feedforward signal processor 521e may include an A/D converter 810, an inverter 1230, a modulator 1250, and a D/A converter 1270.

The A/D converter 810 may be configured to convert an analog primary noise signal $S_n(t)$ into a digital primary noise signal $S_n(n)$. The sampling frequency of the A/D converter 810 may be greater than $2W_{max}$, wherein $W_{max}$ refers to the maximum frequency of the noise signal. More descriptions regarding the A/D conversion may be found elsewhere in the present disclosure. See, e.g., FIG. 3B and relevant descriptions thereof.

The inverter 1230 may be configured to determine a phase inverted signal $S'_n(n)$ based on the digital noise signal $S_n(n)$.

The modulator 1250 may be configured to determine a digital primary noise correction signal $A_tS'_n(n-\Delta T)$ by performing phase modulation and/or amplitude modulation on the phase inverted signal $S'_n(n)$. The modulator 1250 may include a phase modulator and/or an amplitude modulator. For example, the phase modulator may perform a phase compensation on the phase inverted signal $S'_n(n)$ to generate a signal $S'_n(n-\Delta T)$. The amplitude modulator may perform amplitude modulation on the signal $S'_n(n-\Delta T)$ according to an amplitude modulation coefficient $A_t$ to generate the digital primary noise correction signal $A_tS'_n(n-\Delta T)$.

The D/A converter 1270 may be configured to convert the digital primary noise correction signal $A_tS'_n(n-\Delta T)$ into an analog primary noise correction signal $S_{f1}(t)$.

The feedback signal processor 522e may be configured to determine a residual noise correction signal (e.g., $S_{f2}(t)$) for reducing a residual noise in a feedback noise control path. The feedback signal processor 522e may include an A/D converter 820, a modulator 860, and a D/A converter 1280. The D/A converter 1280 may have similar functions as the D/A converter 1270 as described above. More descriptions regarding the A/D converter 820 and the modulator 860 may be found elsewhere in the present disclosure. See, e.g., FIG. 8 and relevant descriptions thereof.

In some embodiments, the modulator 1250 and the modulator 860 may include a sub-band modulator group, respectively. More descriptions regarding a sub-band modulator group may be found elsewhere in the present disclosure. See, e.g., FIG. 9 and relevant descriptions thereof.

The data processing device 110E may output one or more noise correction signals. For example, the data processing device 110E may combine the primary noise correction signal 1211 (e.g., $S_{f1}(t)$) and the residual noise correction signal 1213 (e.g., $S_{f2}(t)$) to output a combined noise correction signal (e.g., $S_{f1}(t)+S_{f2}(t)$). For another example, the data processing device 110E may output the primary noise correction signal 1211 and the residual noise correction signal 1213, respectively, through two communication channels.

In some embodiments, the primary noise correction signal 1211 and the residual noise correction signal 1213 may be sent to a first bone conduction speaker and a second bone conduction speaker, respectively, for output.

Figure 13:
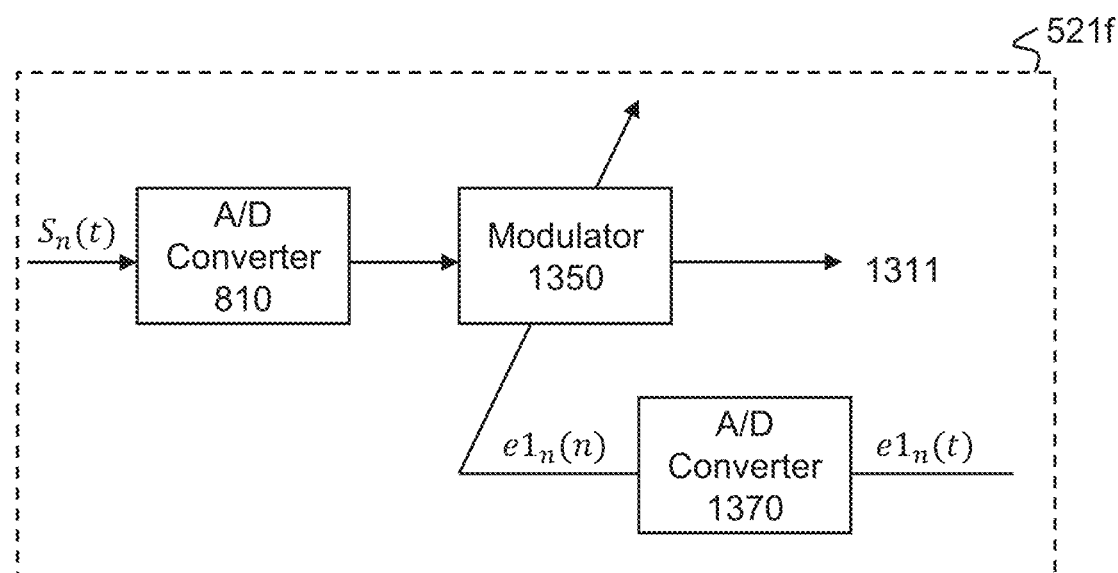
FIG. 13 is a schematic diagram illustrating an exemplary data processing device according to some embodiments of the present disclosure.

FIG. 13 is a schematic diagram illustrating an exemplary data processing device 110F according to some embodiments of the present disclosure. The data processing device 110F may include a feedforward signal processor 521f. The feedforward signal processor 521f may include an A/D converter 810, a modulator 1350 and an A/D converter 820. The data processing device 110F may be configured to determine a noise correction signal 1311.

The feedforward signal processor 521c may be configured to receive a primary noise signal representing a primary noise, and determine a primary noise correction signal 1311 for reducing the primary noise based on the primary noise signal in a feedforward noise control path. The primary noise signal may be in a form of an analog signal $S_n(t)$.

The A/D converter 810 may be configured to convert the analog signal $S_n(t)$ to a digital primary noise signal $S_n(n)$. More descriptions regarding the A/D conversion may be found elsewhere in the present disclosure. See, e.g., FIG. 3B and relevant descriptions thereof.

The digital primary noise signal $S_n(n)$ may be processed by the modulator 1350. The modulator 1350 may perform amplitude modulation and/or phase modulation (e.g., a phase inversion, a phase compensation) on the digital primary noise signal $S_n(n)$. For example, the modulator 1350 may perform the phase inversion on the digital primary noise signal $S_n(n)$ to generate a primary noise correction signal $S'_n(n)$ having the same amplitude as and an inverted phase to the digital primary noise signal $S_n(n)$. As another example, the modulator 1350 may determine the primary noise correction signal as $A_tS'_n(n-\Delta T)$, where $A_t$ refers to an amplitude adjustment coefficient, and $\Delta T$ refers to a time difference between a first time for an air conduction sound to transmit to the cochlea 207 along the air conduction pathway 211 and a second time for a bone conduction sound to transmit to the same cochlea 207 along the bone conduction pathway 221. More descriptions regarding the phase compensation and the amplitude modulation may be found elsewhere in the present disclosure. See, e.g., FIG. 2B and relevant descriptions thereof.

An error detector (not shown in FIG. 13) may be configured to determine an error signal $e1_n(t)$ by a superposition of a primary sound field and a secondary sound field. The primary sound field may correspond to a primary noise (i.e., an ambient noise). The secondary sound field may correspond to an anti-noise sound determined based on the primary noise.

One or more components of the data processing device 110F (e.g., a filter) may be configured to perform an adaptive control, for example, an adjustment of the amplitude adjustment coefficient $A_t$ and/or an adjustment of the time difference $\Delta T$ to make $e1_n(n)\rightarrow 0$. By the adaptive control, an active noise control may be achieved.

It should be noted that the above descriptions of the data processing devices 110A-F are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the data processing devices 110A-F may include one or more additional components. Additionally or alternatively, one or more components of the data processing devices 110A-F described above may be omitted. For example, one or more of the A/D converters 810, 820, and 1370, and the D/A converters 1280 and 1270 may be omitted. As another example, two or more components of the data processing devices 110A-F may be integrated into a single component. Merely by way of example, in the A/D convertor 810 (or 820) may be integrated into the modulator 1250 (or 860), and/or the D/A convertor 1270 (or 1280) may also be integrated into the modulator 1250 (or 860).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for reducing noise, comprising:
a first detector configured to detect a noise transmitted to a user from a first sound pathway, and determine a noise signal for representing the noise;
a second detector configured to determine an error signal;
a processor configured to determine a noise correction signal based on the error signal, the noise signal, and a time difference between a first time and a second time; and
a bone conduction speaker configured to generate a sound based on the noise correction signal, wherein the sound is used to reduce the noise and is transmitted to the user through a second sound pathway, the first time is associated with the first sound pathway, and the second time is associated with the second sound pathway.

2. The system of claim 1, wherein the first sound pathway is an air conduction pathway, and the second sound pathway is a bone conduction pathway.

3. The system of claim 2, wherein to determine the noise correction signal based on the error signal, the noise signal, and the time difference between the first time and the second time, the processor performs operations including:
- determining the first time for an air conduction sound transmitted along the air conduction pathway;
- determining the second time for a bone conduction sound transmitted along the bone conduction pathway; and
- determining the time difference based on the first time and the second time.

4. The system of claim 2, wherein to determine the noise correction signal based on the error signal, the noise signal, and the time difference between the first time and the second time, the processor performs operations including:
- determining an amplitude adjustment coefficient corresponding to the air conduction pathway and the bone conduction pathway;
- adjusting the amplitude adjustment coefficient and the time difference based on the error signal; and
- determining the noise correction signal based on an adjusted amplitude adjustment coefficient, an adjusted time difference, and the noise signal.

5. The system of claim 4, wherein the determining the amplitude adjustment coefficient comprises:
- determining a first transfer function of the air conduction pathway;
- determining a second transfer function of the bone conduction pathway; and
- determining the amplitude adjustment coefficient based on the first transfer function and the second transfer function.

6. The system of claim 1, wherein the processor includes a modulator configured to perform amplitude modulation and/or phase modulation.

7. The system of claim 1, wherein the second detector is an error microphone.

8. The system of claim 1, wherein the error signal is corresponding to a superposition of a primary sound field and a secondary sound field, the primary sound field is corresponding to the noise, and the secondary sound field is corresponding to the sound.

9. A method for reducing noise, comprising:
- determining a noise signal by detecting, by a detector, a noise transmitted to a user from a first sound pathway;
- determining a noise correction signal, by a processor, based on an adaptive adjustment process, the noise signal, and a time difference between a first time and a second time; and
- generating a sound, by a bone conduction speaker, based on the noise correction signal, wherein the sound is used to reduce the noise and is transmitted to the user through a second sound pathway, the first time is associated with the first sound pathway, and the second time is associated with the second sound pathway.

10. The method of claim 9, wherein the first sound pathway is an air conduction pathway, and the second sound pathway is a bone conduction pathway.

11. The method of claim 10, wherein the determining the noise correction signal based on the adaptive adjustment process, the noise signal, and the time difference between the first time and the second time comprises:
- determining the first time for an air conduction sound transmitted along the air conduction pathway;
- determining the second time for a bone conduction sound transmitted along the bone conduction pathway; and
- determining the time difference based on the first time and the second time.

12. The method of claim 10, wherein the determining the noise correction signal based on the adaptive adjustment process, the noise signal, and the time difference between the first time and the second time comprises:
- determining an amplitude adjustment coefficient corresponding to the air conduction pathway and the bone conduction pathway;
- adjusting the amplitude adjustment coefficient and the time difference based on an error signal; and
- determining the noise correction signal based on an adjusted amplitude adjustment coefficient, an adjusted time difference, and the noise signal.

13. The method of claim 12, wherein determining the amplitude adjustment coefficient comprises:
- determining a first transfer function of the air conduction pathway;
- determining a second transfer function of the bone conduction pathway; and
- determining the amplitude adjustment coefficient based on the first transfer function and the second transfer function.

14. The method of claim 12, wherein the error signal is corresponding to a superposition of a primary sound field and a secondary sound field, the primary sound field is corresponding to the noise, and the secondary sound field is corresponding to the sound.

15. The method of claim 9, wherein the processor includes a modulator configured to perform amplitude modulation and/or phase modulation.

16. A system for reducing noise, comprising:
- a detector configured to generate a noise signal, wherein the noise signal indicates a second noise perceived by a user and the second noise includes a residual sound in an inner ear of the user;
- a processor configured to determine a noise correction signal based on the noise signal and a time difference between a reference value and a transmission time associated with a bone conduction pathway; and
- a speaker configured to generate a sound based on the noise correction signal, wherein the sound is transmitted to the user through the bone conduction pathway.

17. The system of claim 16, wherein the detector is a nerve monitoring device or a brain wave monitoring device, and the speaker is a bone conduction speaker.

18. The system of claim 17, wherein to determine the noise correction signal based on the noise signal and the time difference, the processor is configured to perform operations comprising:
- determining an amplitude adjustment coefficient;
- determining a phase inverted signal of the noise signal; and
- determining the noise correction signal based on the amplitude adjustment coefficient, the time difference, and the phase inverted signal of the noise signal.

19. The system of claim 16, wherein the system further comprises one or more filters configured to decompose the noise signal into one or more sub-band noise signals.

20. The system of claim 16, wherein the time difference is detected by a feedback detector.

* * * * *